United States Patent
McWithey et al.

(10) Patent No.: US 11,987,168 B2
(45) Date of Patent: *May 21, 2024

(54) SYSTEMS AND METHODS FOR ILLUMINATION CONTROL AND DISTRIBUTION DURING A VEHICLE BANK

(71) Applicant: J.W. SPEAKER CORPORATION, Germantown, WI (US)

(72) Inventors: Kevin Jay McWithey, Fond du Lac, WI (US); Bradley William Kay, Mequon, WI (US); Dragolsav Popovic, Germantown, WI (US)

(73) Assignee: J.W. SPEAKER CORPORATION, Germantown, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,839

(22) Filed: Sep. 19, 2022

(65) Prior Publication Data
US 2023/0010891 A1    Jan. 12, 2023

Related U.S. Application Data

(63) Continuation of application No. 16/893,867, filed on Jun. 5, 2020, now Pat. No. 11,447,062, which is a
(Continued)

(51) Int. Cl.
*B60Q 1/00* (2006.01)
*B60Q 1/115* (2006.01)
(Continued)

(52) U.S. Cl.
CPC ............ *B60Q 1/0041* (2013.01); *B60Q 1/115* (2013.01); *B60Q 1/12* (2013.01); *B62J 6/023* (2020.02);
(Continued)

(58) Field of Classification Search
CPC ........ B60Q 1/0041; B60Q 1/115; B60Q 1/12; B60Q 1/346; B60Q 2300/134;
(Continued)

(56) References Cited

U.S. PATENT DOCUMENTS

| 4,024,388 A | 5/1977 | Skoff |
| 4,870,545 A | 9/1989 | Hatanaka et al. |

(Continued)

FOREIGN PATENT DOCUMENTS

| CN | 1769127 A | 5/2006 |
| CN | 102862507 A | 1/2013 |

(Continued)

OTHER PUBLICATIONS

Jasic Explanation of Motorcycle AFS; Agenda 10(a); The 60th Session of GRE; Oct. 1-3, 2008; 5 pages.
(Continued)

*Primary Examiner* — Peter D Nolan
*Assistant Examiner* — Wae L Louie
(74) *Attorney, Agent, or Firm* — Quarles & Brady LLP

(57) ABSTRACT

A bank angle of a vehicle can be accurately calculated using yaw axis data and roll axis data, and based on the calculated bank angle, vehicle illumination optics can be controlled to maintain a pattern of distributed light from the illumination optics to be generally horizontal. The calculated bank angle may be zeroed when the yaw axis data equals zero. The improved pattern of distributed light from the illumination optics illuminates a more natural field of view for the vehicle driver during a bank.

20 Claims, 18 Drawing Sheets

Related U.S. Application Data continuation of application No. 16/003,907, filed on Jun. 8, 2018, now Pat. No. 10,676,018, which is a continuation of application No. 14/273,045, filed on May 8, 2014, now Pat. No. 10,023,103.

(60) Provisional application No. 61/877,513, filed on Sep. 13, 2013.

(51) Int. Cl.
| | | |
|---|---|---|
| *B60Q 1/12* | (2006.01) | |
| *B62J 6/023* | (2020.01) | |
| *G01B 5/24* | (2006.01) | |
| *G01C 19/00* | (2013.01) | |
| *B60Q 1/34* | (2006.01) | |

(52) U.S. Cl.
CPC ............... *G01B 5/24* (2013.01); *G01C 19/00* (2013.01); *B60Q 1/346* (2013.01); *B60Q 2300/134* (2013.01); *B60Q 2300/136* (2013.01)

(58) Field of Classification Search
CPC ...... B60Q 2300/136; B62J 6/023; G01B 5/24; G01C 19/00
See application file for complete search history.

(56) References Cited

U.S. PATENT DOCUMENTS

| | | | |
|---|---|---|---|
| 5,426,571 A | 6/1995 | Jones | |
| 6,185,489 B1* | 2/2001 | Strickler | B60G 17/0162 |
| | | | 701/38 |
| 6,309,093 B1 | 10/2001 | Tabata et al. | |
| 6,941,206 B2 | 9/2005 | Hasegawa et al. | |
| 7,036,963 B2 | 5/2006 | Fukawa | |
| 7,057,503 B2 | 6/2006 | Watson | |
| 7,156,542 B2 | 1/2007 | Miller et al. | |
| 7,164,117 B2* | 1/2007 | Breed | B60N 2/002 |
| | | | 250/221 |
| 7,437,242 B2 | 10/2008 | Hanya | |
| 7,445,364 B2 | 11/2008 | Gropp et al. | |
| 7,556,410 B2 | 7/2009 | Nakano et al. | |
| 7,648,000 B2 | 1/2010 | Kimura | |
| 7,653,215 B2 | 1/2010 | Stam | |
| 7,690,826 B2 | 4/2010 | Kim | |
| 7,996,131 B2 | 8/2011 | Yamashita | |
| 8,155,798 B2 | 4/2012 | Seiniger et al. | |
| 8,260,504 B2 | 9/2012 | Tsujii et al. | |
| 8,260,505 B2 | 9/2012 | Peeters et al. | |
| 8,342,723 B2 | 1/2013 | Mochizuki | |
| 8,380,391 B2 | 2/2013 | Baino | |
| 8,398,277 B2 | 3/2013 | Fritz et al. | |
| 8,550,673 B1 | 10/2013 | Jones, Jr. | |
| 2005/0004730 A1 | 1/2005 | Suzuki et al. | |
| 2005/0068782 A1 | 3/2005 | Sugimoto et al. | |
| 2005/0099818 A1 | 5/2005 | Gropp et al. | |
| 2006/0007697 A1 | 1/2006 | Ackermann | |
| 2006/0023461 A1 | 2/2006 | Knight | |
| 2006/0208169 A1* | 9/2006 | Breed | G01S 17/88 |
| | | | 250/221 |
| 2007/0195270 A1 | 8/2007 | Hull et al. | |
| 2009/0088926 A1 | 4/2009 | Yamashita | |
| 2010/0168958 A1* | 7/2010 | Baino | B60Q 1/12 |
| | | | 702/94 |
| 2010/0213872 A1* | 8/2010 | Heider | B60Q 1/12 |
| | | | 315/297 |
| 2010/0232173 A1 | 9/2010 | Ohno et al. | |
| 2011/0169410 A1 | 7/2011 | Dassanayake et al. | |
| 2011/0210666 A1 | 9/2011 | Shiao et al. | |
| 2011/0210667 A1 | 9/2011 | Shiao et al. | |
| 2011/0211359 A1 | 9/2011 | Shiao et al. | |
| 2011/0216548 A1* | 9/2011 | Fritz | B60Q 1/12 |
| | | | 362/465 |
| 2011/0270466 A1* | 11/2011 | Nakadori | B60W 40/076 |
| | | | 701/1 |
| 2012/0067122 A1* | 3/2012 | Sakamoto | B60W 40/112 |
| | | | 73/488 |
| 2013/0148369 A1 | 6/2013 | Haest | |
| 2013/0311049 A1* | 11/2013 | Lee | B60Q 1/12 |
| | | | 701/49 |
| 2014/0046623 A1 | 2/2014 | Lemejda | |
| 2014/0067155 A1* | 3/2014 | Yu | B60W 40/13 |
| | | | 701/1 |
| 2015/0081168 A1* | 3/2015 | McWithey | B60Q 1/115 |
| | | | 702/151 |
| 2015/0151669 A1* | 6/2015 | Meisner | G06V 20/584 |
| | | | 701/49 |
| 2018/0218229 A1* | 8/2018 | Murillo Amaya | B60Q 1/085 |
| 2019/0086065 A1* | 3/2019 | Hirose | H05B 45/38 |
| 2019/0366908 A1* | 12/2019 | Horn | B62J 45/4151 |
| 2020/0331552 A1* | 10/2020 | Horn | B62J 6/024 |
| 2021/0078484 A1* | 3/2021 | Fujii | B60Q 1/122 |
| 2023/0192210 A1* | 6/2023 | Horn | B60Q 1/0023 |
| | | | 362/475 |

FOREIGN PATENT DOCUMENTS

| | | |
|---|---|---|
| DE | 10300771 A1 | 5/2004 |
| DE | 102005003656 A1 | 9/2005 |
| DE | 102006039182 A1 | 3/2008 |
| DE | 102007050220 A1 | 5/2008 |
| DE | 102010030675 A1 | 1/2011 |
| DE | 102010037210 A1 | 5/2011 |
| EP | 0475093 A1 | 3/1992 |
| EP | 1800947 A1 | 6/2007 |
| EP | 2221219 A1 | 8/2010 |
| EP | 2213511 B1 | 8/2013 |
| EP | 2657076 A1 | 10/2013 |
| EP | 2657078 A2 | 10/2013 |
| EP | 2657080 A2 | 10/2013 |
| EP | 2669114 A2 | 12/2013 |
| EP | 2669116 A2 | 12/2013 |
| EP | 2669161 A1 | 12/2013 |
| EP | 2669162 A1 | 12/2013 |
| EP | 2669163 A1 | 12/2013 |
| EP | 2676839 A1 | 12/2013 |
| EP | 2676872 A1 | 12/2013 |
| GB | 1352102 | 5/1974 |
| JP | 2001219881 A | 8/2001 |
| JP | 2001352263 A | 12/2001 |
| JP | 2004155404 A | 6/2004 |
| JP | 2004534683 A | 11/2004 |
| JP | 2006131212 A | 5/2006 |
| JP | 2008001305 A | 1/2008 |
| JP | 2008207770 A | 9/2008 |
| JP | 2012042289 A | 3/2012 |
| JP | 2012254729 A | 12/2012 |
| WO | 2010061651 A1 | 3/2010 |
| WO | 2011114270 A1 | 9/2011 |

OTHER PUBLICATIONS

PCT International Search Report and Written Opinion, PCT/US2014/053137, Nov. 25, 2014, 11 pages.

European Patent Office, Extended Search Report, Application No. 22157574.9, May 27, 2022, 11 pages.

* cited by examiner

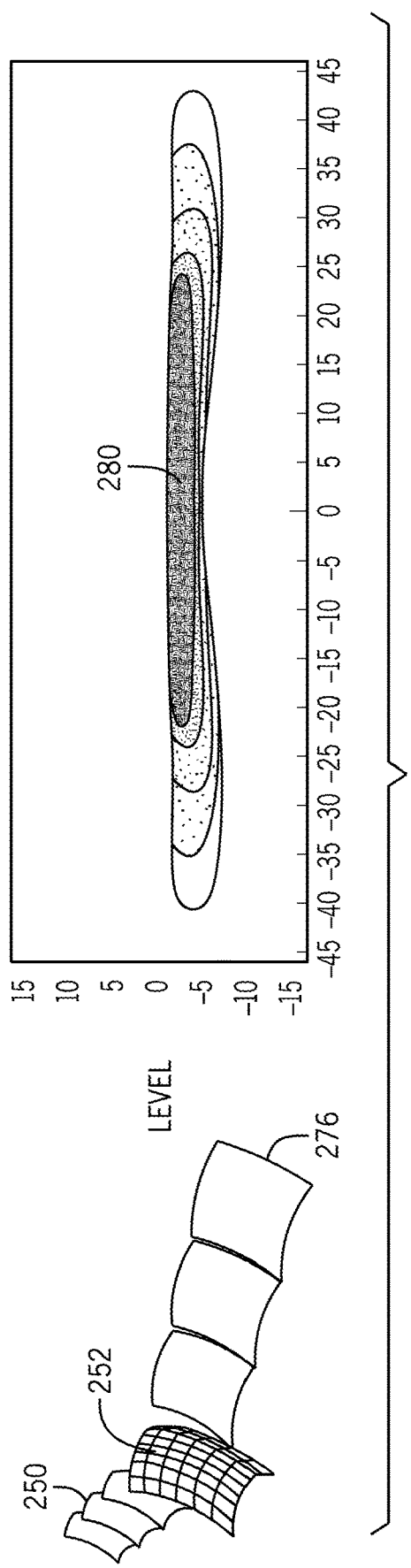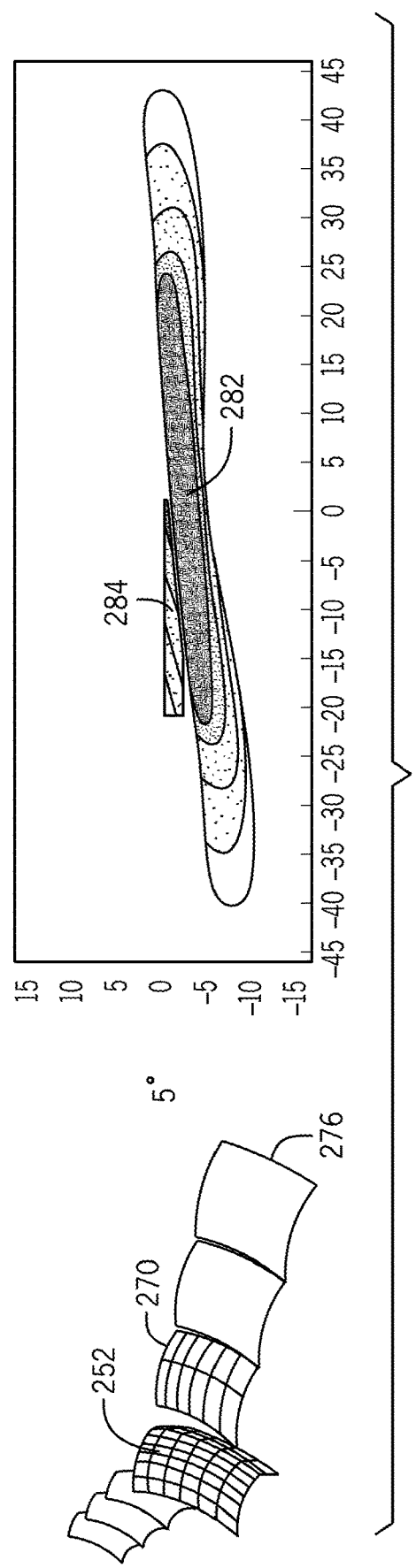
FIG. 27
FIG. 28

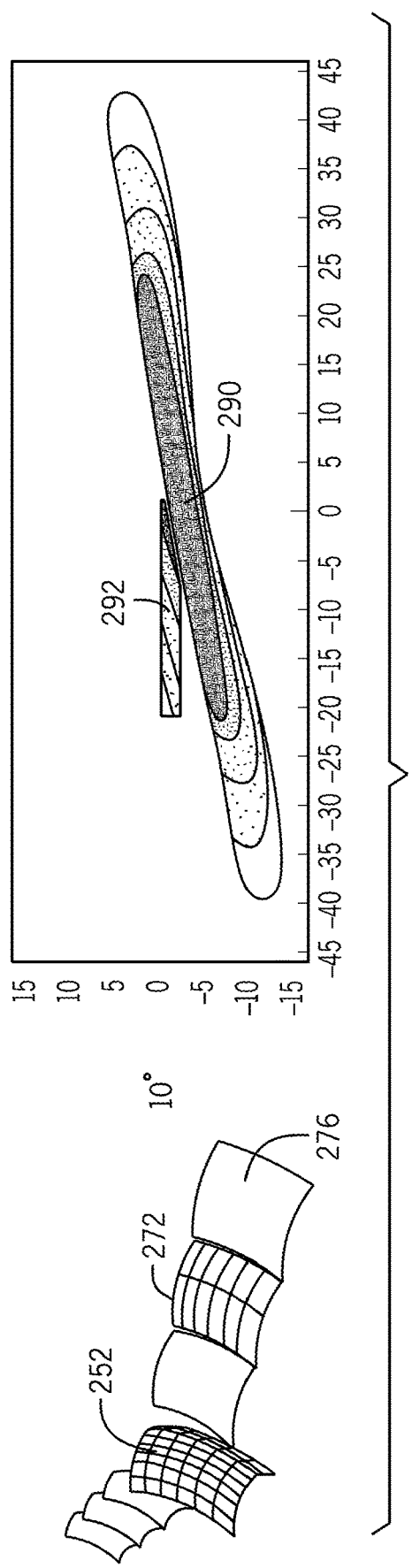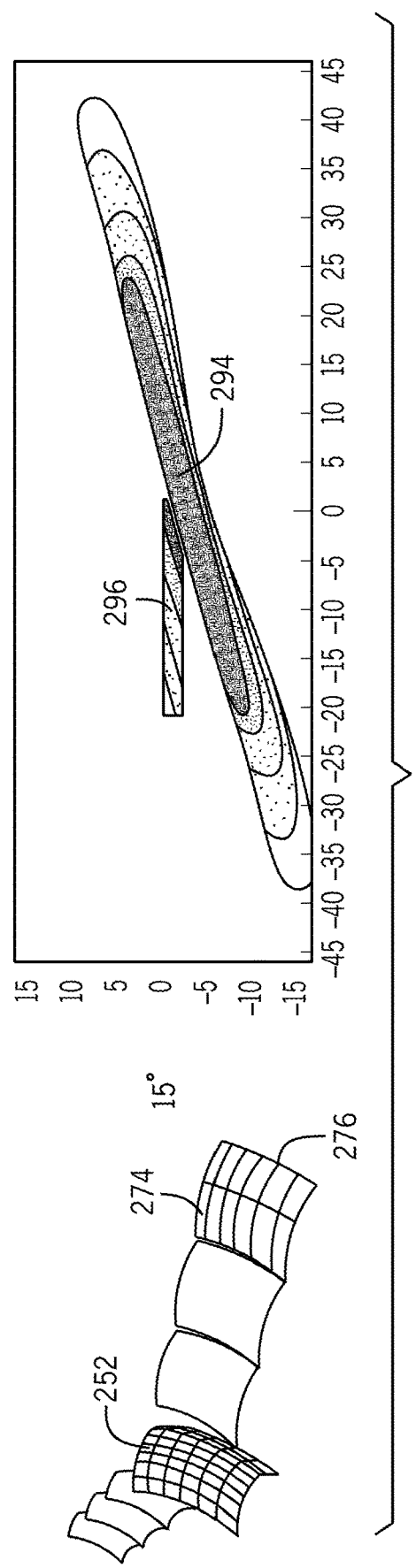

SYSTEMS AND METHODS FOR ILLUMINATION CONTROL AND DISTRIBUTION DURING A VEHICLE BANK

CROSS-REFERENCE TO RELATED APPLICATIONS

This application is a continuation of U.S. patent application Ser. No. 16/893,867 filed Jun. 5, 2020, now U.S. Pat. No. 11,447,062 issued Sep. 20, 2022, which is a continuation of U.S. patent application Ser. No. 16/003,907 filed Jun. 8, 2018, now U.S. Pat. No. 10,676,018 issued Jun. 9, 2020, which is a continuation of U.S. patent application Ser. No. 14/273,045, filed on May 8, 2014, now U.S. Pat. No. 10,023,103 issued Jul. 17, 2018, which claims the benefit of U.S. Provisional Patent Application No. 61/877,513, filed Sep. 13, 2013, and entitled "Systems and Methods for Illumination Control and Distribution During a Vehicle Bank," each of which is herein incorporated by reference.

STATEMENT REGARDING FEDERALLY SPONSORED RESEARCH OR DEVELOPMENT

Not applicable.

BACKGROUND OF THE INVENTION

The present invention relates to systems and methods for illumination control and distribution during a vehicle bank, such as when vehicle banks in order to take a curve or to turn, and more specifically to illumination control and distribution systems and methods that control and maintain a pattern of light generally horizontal during the vehicle bank.

For example, FIG. 1 shows a motorcycle 40 traveling generally straight in a lane on a road 42. As can be seen, motorcycle headlights have a primarily horizontally shaped light beam pattern 44 that is shaped according to requirements to illuminate the road 42 ahead without disruptively shining on oncoming traffic, and to provide sufficient illumination for the drivers line of sight area 46. Unfortunately, the light beam pattern 44 suits illumination requirements when the motorcycle is traveling generally straight forward, but not when the motorcycle is banking.

When a vehicle such as the motorcycle 40 makes a turn, the motorcycle typically goes through some degree of bank angle, i.e., the motorcycle banks as the motorcycle is making a turn or traveling through a curve. Referring to FIG. 2, unfortunately, the headlight used in most motorcycles is secured to the motorcycle frame in a fixed position, which causes the horizontally shaped light beam pattern 44 cast by the motorcycle headlight to correspondingly tilt and bank as the motorcycle is banked on a curved road 48. The banking of the headlight along with the motorcycle 40 causes the amount of light distributed by the motorcycle headlight to shift in an inward and downward direction, which is away from the actual direction of travel of the motorcycle, and away from the focus of the motorcycle driver's eyes and line of sight area 46. This is particularly concerning for motorcycle drivers during cornering at night. With the amount of light distributed by the headlight light beam focused more in an inwardly direction, the driver's illuminated field of view generally forward of the direction of travel is reduced.

Attempts have been made to address the shortcomings of standard headlights that work well when the motorcycle is traveling straight ahead, but not when the motorcycle is banking. Systems have been suggested that include a velocity sensor along with several gyroscopes to detect the roll rate and the yaw rate of the motorcycle. Based on extensive calculations using the motion data from the gyroscopes and the velocity sensor, a mechanical system rotates or adjusts the rotational orientation about the optical axis of the headlight in a direction opposite to the bank angle of the motorcycle. Other systems mechanically move a mirror to adjust the direction of illumination coming from a fixed light source. Each of these systems requires complex computations, which require complex electronics, and they also require sophisticated mechanical systems to provide movement of the illumination from the light source. The mechanical systems add complexity and cost to both the headlight and the overall vehicle cost.

Some steerable headlights have been developed that address problems related to mechanically rotating headlights for automobiles. For instance, it is known to provide a one or two dimensional array of LEDs where the LEDs generate separate adjacent light fields and where different horizontal subsets of the LEDs may be illuminated to generate light patterns at different locations in front of the automobile. Although this type of arrangement may provide adjustable horizontal illumination for an automobile, it inadequately addresses the effect when a vehicle, such as a motorcycle, is banking. Merely providing additional illumination to the left or to the right fails to illuminate the portion of the curved road ahead of a motorcycle driver. The horizontal row of LEDs and associated horizontally shaped light beam pattern is still rotated off of horizontal and would tilt and bank during the vehicle bank (see FIGS. 1 and 2).

What is needed are systems and methods that accurately calculate a bank angle, and based upon the bank angle, alter a distribution of illumination to more naturally illuminate more of the driver's field of view.

BRIEF SUMMARY OF THE INVENTION

It has been recognized that an angle of a vehicle can be accurately calculated using axis data, and based on the calculated angle, vehicle illumination optics can be controlled to maintain a pattern of illumination from an illumination source to be generally horizontal. For example, a bank angle of a vehicle can be accurately calculated using roll axis data, and based on the calculated bank angle, the illumination optics can be controlled, or the pitch rate data can be used to provide an improved illumination pattern when the vehicle is pitching either up or down due to a hill in the road, for example. In some embodiments, roll axis data and/or motion sensor offset can be incorporated into the bank angle calculation. In some embodiments, when yaw axis data equals zero, the calculated bank angle can be zeroed. The improved pattern of distributed illumination from the illumination source illuminates a more natural field of view for the vehicle driver during a bank. In some embodiments, the vehicle illumination source can include a primary illumination group and a plurality of side illumination groups.

In accordance with an embodiment of the invention, an apparatus is provided for calculating a bank angle value of a banking vehicle. The apparatus comprises an inertial measurement unit, the inertial measurement unit including a processor and at least one motion sensor operatively coupled to the processor. The processor is programmed to sample yaw rate data at a predetermined rate, the yaw rate data provided by the at least one motion sensor; compare the yaw rate data to a predefined minimum yaw rate and a predefined maximum yaw rate, and when the yaw rate data is between the predefined minimum yaw rate and the predefined maximum yaw rate, set a bank angle value to zero; and when the yaw rate data is not between the predefined minimum yaw rate and the predefined maximum yaw rate, calculate the bank angle value.

In accordance with an additional embodiment of the invention, an apparatus is provided for controlling a horizontal distribution of illumination from a vehicle when the vehicle is banking, the vehicle including a headlamp to distribute the horizontal distribution of illumination. The apparatus comprises an inertial measurement unit, the inertial measurement unit including a processor and a motion sensor operatively coupled to the processor, the motion sensor to be coupled to the banking vehicle. The processor is programmed to sample yaw rate data at a predetermined rate, the yaw rate data provided by the motion sensor coupled to the banking vehicle; receive a motion sensor offset value; compare the yaw rate data to a predefined minimum yaw rate and a predefined maximum yaw rate, and when the yaw rate data is between the predefined minimum yaw rate and the predefined maximum yaw rate, determine if the motion sensor offset value is between a predefined minimum offset and a predefined maximum offset; when the yaw rate data is not between the predefined minimum yaw rate and the predefined maximum yaw rate, or when the motion sensor offset value is not between the predefined minimum offset and the predefined maximum offset, determine a roll data sum, the roll data sum equal to a roll rate data value minus the motion sensor offset value, and then calculate the bank angle value; and when the motion sensor offset value is between the predefined minimum offset and the predefined maximum offset, set the bank angle value to zero.

In accordance with a further embodiment of the invention, a vehicle headlamp for providing a horizontal distribution of illumination for a vehicle when the vehicle is banking is provided. The headlamp comprises a headlamp housing. An inertial measurement unit is positioned within the housing, the inertial measurement unit including a processor and at least one motion sensor operatively coupled to the processor. A primary illumination group and a plurality of side illumination groups are positioned with the headlamp housing, the primary illumination group and the plurality of side illumination groups operatively coupled to a driver board, the driver board operatively coupled to the processor. The processor is programmed to sample yaw rate data provided by the at least one motion sensor; compare the yaw rate data to a predefined minimum yaw rate and a predefined maximum yaw rate, and when the yaw rate data is between the predefined minimum yaw rate and the predefined maximum yaw rate, set a bank angle value to zero; and when the yaw rate data is not between the predefined minimum yaw rate and the predefined maximum yaw rate, calculate a bank angle value and cause at least one of the plurality of side illumination groups to illuminate to provide the horizontal distribution of illumination for the vehicle when the vehicle is banking.

In accordance with yet a further embodiment, an apparatus for calculating a angle value of a vehicle is provided. The apparatus includes an inertial measurement unit, the inertial measurement unit including a processor and at least one motion sensor operatively coupled to the processor. The processor is programmed to sample motion data at a predetermined rate, the motion data provided by the at least one motion sensor; compare the motion data to a predefined minimum motion rate and a predefined maximum motion rate, and when the motion data is between the predefined minimum motion rate and the predefined maximum motion rate, set a vehicle angle value to zero; and when the motion data is not between the predefined minimum motion rate and the predefined maximum motion rate, calculate the vehicle angle value.

In accordance with yet a further embodiment, a headlight system for a vehicle includes a motion sensor configured to sample yaw rate data, a primary illumination source, a plurality of secondary illumination sources, and a processor configured to control an illumination pattern provided by the primary illumination source and the plurality of secondary illumination sources in response to a bank angle value output by a bank angle calculation. The bank angle calculation is configured to sample the yaw rate date from the motion sensor, and compare the yaw rate data to a predefined minimum yaw rate and a predefined maximum yaw rate. When the yaw rate data is between the predefined minimum yaw rate and the predefined maximum yaw rate, the bank angle value is set to zero. When the yaw rate data is not between the predefined minimum yaw rate and the predefined maximum yaw rate, the bank angle value is calculated.

In accordance with yet a further embodiment, a headlight system for a vehicle includes a motion sensor configured to sample yaw rate data, an illumination source including an array of illumination elements, and a processor configured to control an illumination pattern provided by the illumination source in response to a bank angle value output by a bank angle calculation. The bank angle calculation is configured to sample the yaw rate date from the motion sensor, and compare the yaw rate data to a predefined minimum yaw rate and a predefined maximum yaw rate. When the yaw rate data is between the predefined minimum yaw rate and the predefined maximum yaw rate, the bank angle value is set to zero. When the yaw rate data is not between the predefined minimum yaw rate and the predefined maximum yaw rate, the bank angle value is calculated.

In accordance with yet a further embodiment, a method for calculating a bank angle value and controlling a headlight on a vehicle includes sampling yaw rate data, determining if the yaw rate data is between a predefined minimum yaw rate and a predefined maximum yaw rate, upon determining that the yaw rate data is between the predefined minimum yaw rate and the predefined maximum yaw rate, setting the bank angle value to zero, upon determining that the yaw rate data is not between the predefined minimum yaw rate and the predefined maximum yaw rate, calculating the bank angle value, and controlling an illumination pattern provided by the headlight based on the bank angle value.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIGS. 27-30 are views showing the illumination projection from the headlight shown in FIG. 23 at various bank angles.

Figure 1:
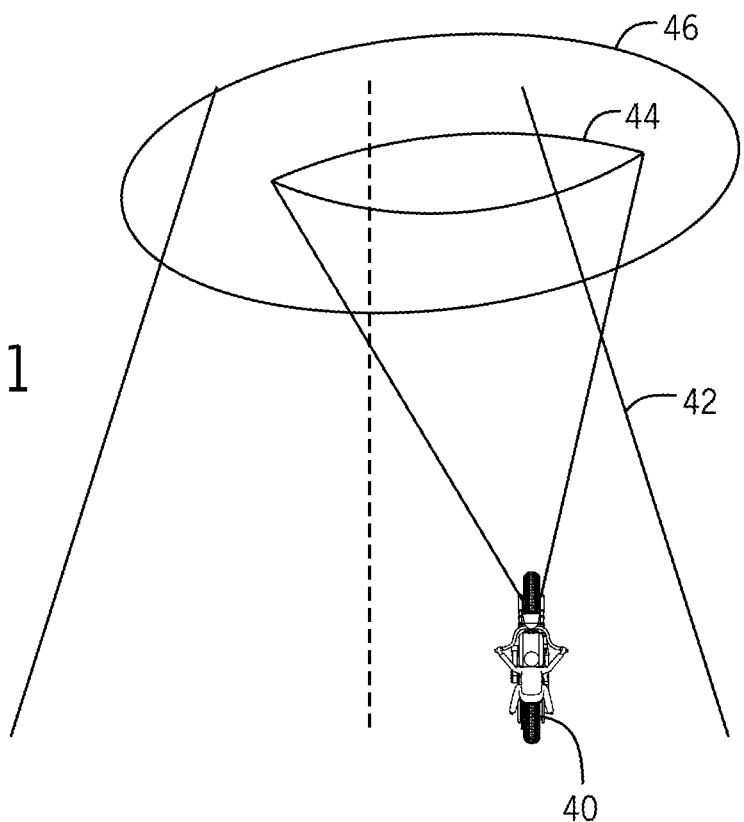
FIG. 1 is a rear view of a motorcycle in a lane of a straight road and showing an illumination pattern generated by the motorcycle's headlight.
Figure 2:
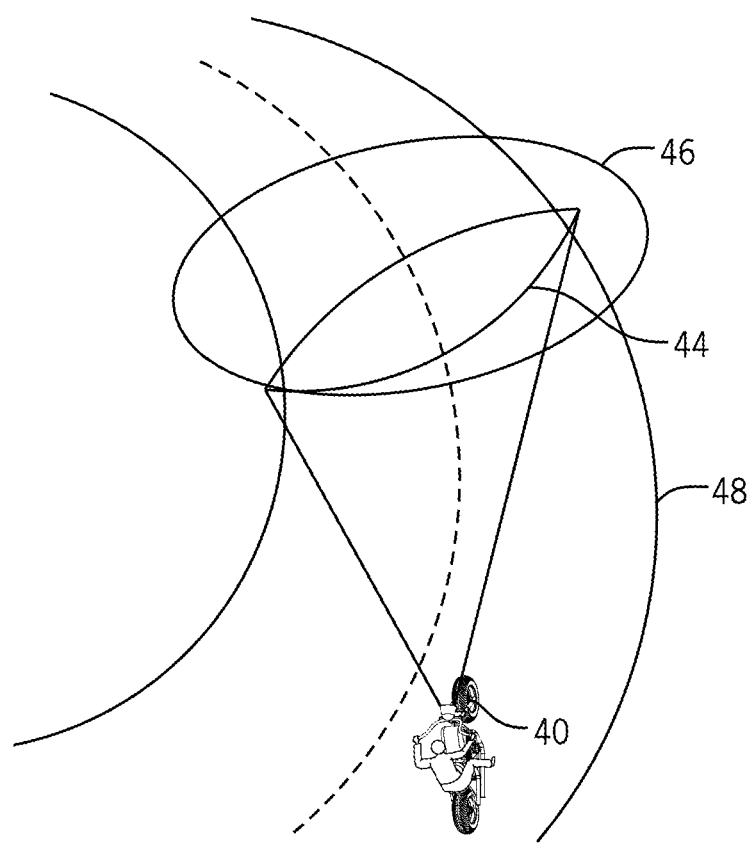
FIG. 2 is similar to FIG. 1, except that the motorcycle is banking through a left hand curve in the road, and showing the illumination pattern generated by the motorcycle's headlight is titling and does not provide sufficient illumination through the curve.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control a source of illumination to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates various illumination control and optics configurations capable of providing controllable illumination patterns.

The various embodiments of the bank angle calculation and illumination source configurations will be described in connection with a motorcycle headlight. That is because the features and advantages of the technology are well suited for this purpose. Still, it should be appreciated that the various aspects of the technology can be applied in other forms of optics and vehicles, and is not limited to motorcycles, as it will be understood that a wide variety of vehicles using a headlight or headlights including automobiles may benefit from bank angle calculations and illumination optics having the features described herein.

Figure 3:
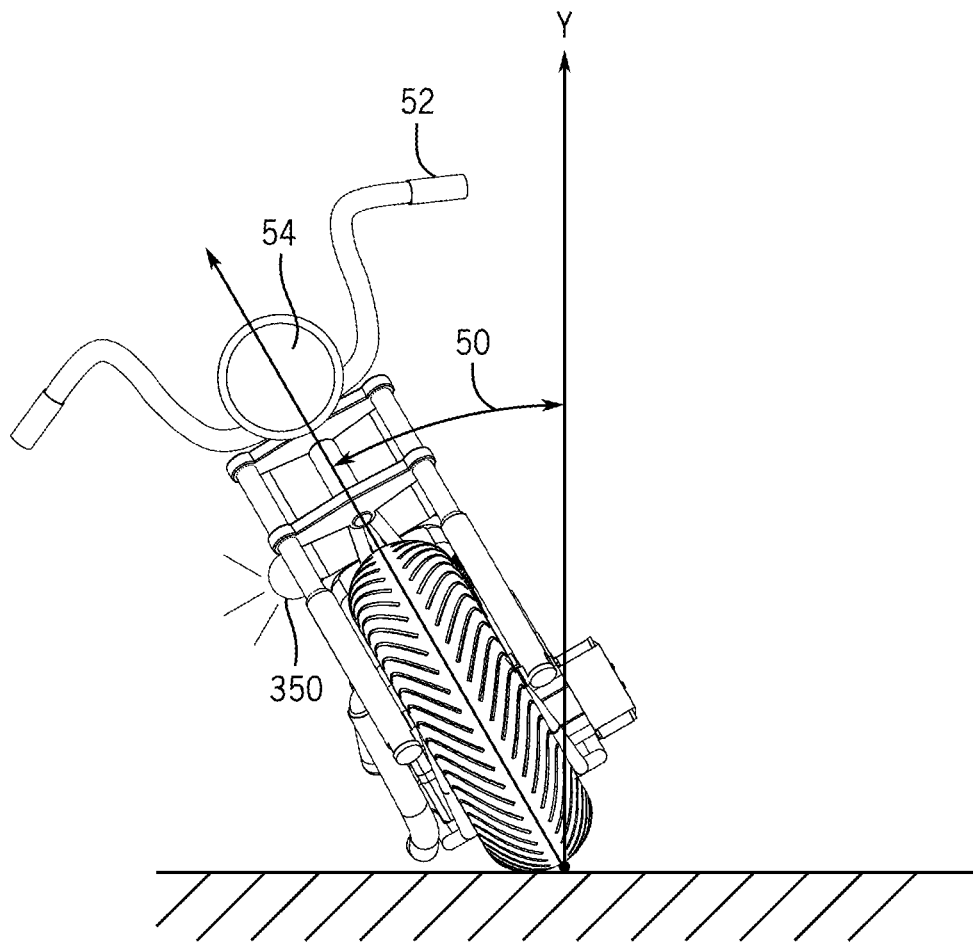
FIG. 3 is a front view of a motorcycle in a bank, and showing a bank angle.
Figure 4:
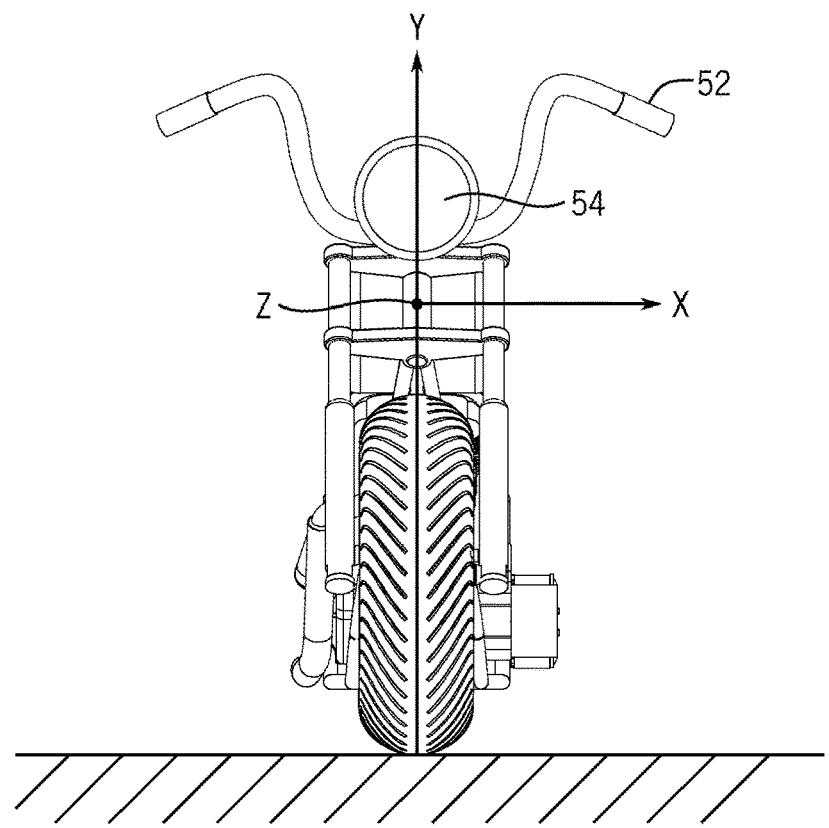
FIG. 4 is a front view of the motorcycle of FIG. 3, and showing X, Y, and Z axes.

Referring now to the drawings wherein like reference numerals correspond to similar elements throughout the several views and, more specifically, referring to FIGS. 3 and 4, at least some embodiments of the present invention include systems and methods for calculation of a bank angle 50 for a vehicle 52. In an exemplary embodiment, the vehicle 52 is shown to be a motorcycle 52, including a headlight 54. It is to be appreciated that a wide variety of other vehicles would also benefit from the present technology, including boats, wave riders, peddle bikes, airplanes, roller coasters, automobiles, and the like, that may bank as the vehicle turns or may be on a banked road. In the embodiments described herein, the bank angle 50 can be used to generate, among other things, an improved illumination pattern during a vehicle bank, to be described in greater detail below.

Figure 5:
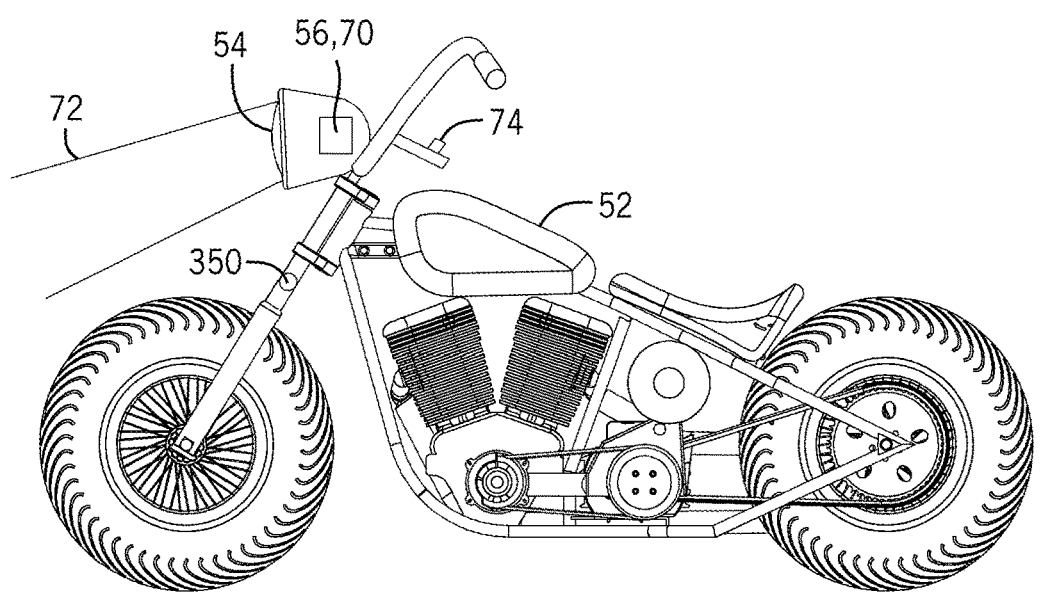
FIG. 5 is a side view of the motorcycle of FIG. 3, and showing a vehicle headlight illumination control and distribution system in accordance with the present embodiments.

Referring to FIG. 5, an exemplary motorcycle 52 can include an inertial measurement unit (IMU) 56. The IMU 56 can provide data including velocity, mass, and angular information, for example, of the motorcycle 52 by way of one or more of the motorcycle's pitch rate data 60 (rotation around the X-axis), yaw rate data 62 (rotation around the Y-axis), roll rate data 64 (rotation around the Z-axis) and acceleration data 66 in at least the X, Y, and Z axes (see FIG. 4). From combinations of these measurements, the bank angle 50 can be calculated. In some embodiments, the calculated bank angle 50 can then be provided to vehicle electronics 70. In some embodiments, the IMU 56 is included with the vehicle electronics 70. The IMU 56 and or the vehicle electronics 70 can utilize the calculated bank angle 50 to control illumination 72 from the vehicle headlight 54. In some embodiments, a switch 74 can also be operationally coupled to the vehicle electronics 70 to switch the headlight 34 between a high beam mode and a low beam mode, for example, or to control other illumination features of the vehicle headlight 54. As is known, the low beam mode provides illumination that is aimed slightly down to avoid blinding oncoming drivers, and the high beam mode provides illumination typically at a higher wattage and that is aimed more further ahead to give the driver a longer illuminated view. The features described herein are contemplated for both low beam mode and high beam mode.

Figure 6:
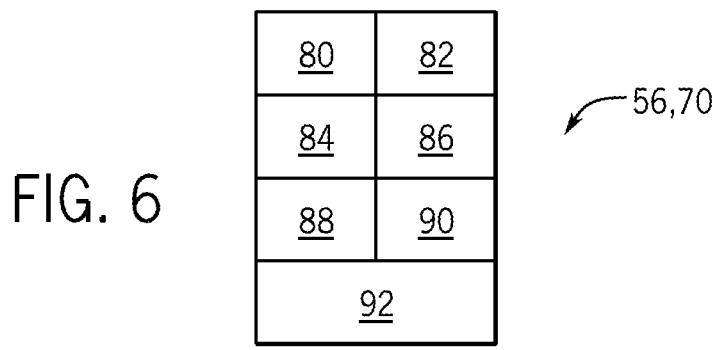
FIG. 6 is a schematic view of an inertial measurement unit usable with the vehicle headlight illumination control and distribution system in accordance with the present embodiments.

Referring to FIG. 6, the IMU 56 and/or the vehicle electronics 70 can comprise individual components or can be a single integrated chip, for example. In some embodiments, the IMU 56 can include combinations of a processor 80, and a motion sensor or sensors including a gyroscope 82, an accelerometer 84, a magnetic sensor 86, a communication device, e.g., a communications port 88, and a wireless communication device 90, depending on the application. The processor 80 can include internal memory and/or memory 92 can be included. It is to be appreciated that the IMU 56 can include a variety of configurations. Single axis and/or multi-axis motion sensors including but not limited to gyroscopes, accelerometers, and magnetic sensors can be used. Other embodiments can include built-in filtering algorithms and can also include data logging. The communication device, i.e., the communication port 88 and the wireless communications 90 are not required, but may be included to provide the user data access and/or illumination customization features, as non-limiting examples. A communication port 88 can comprise a USB port or RS-232 port or other known serial or parallel communication port configurations. The IMU 56 can also include plug and play capabilities, i.e., plug and play operable with a vehicle control system.

Figure 7:
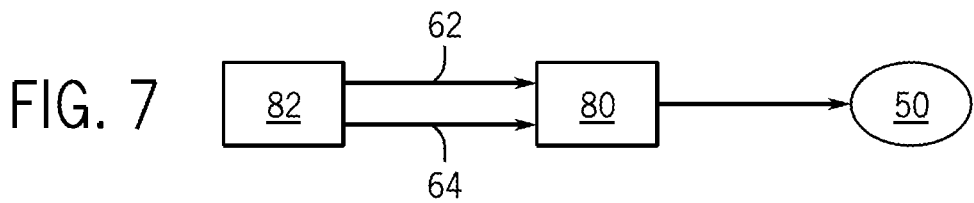
FIG. 7 is a schematic view of process using an inertial measurement unit to calculate a bank angle.

In some embodiments, the IMU 56 can include a processor 80 and a motion sensor 82 that senses at least two axis, such as a two-axis MEMS gyroscope 82. The motion sensor 82 can provide the measurement data usable to produce the calculated bank angle 50, which can be calculated from the yaw rate data 62 and the roll rate data 64 (see FIG. 7).

The processor 80 can use the simplified equation below to produce the calculated bank angle 50:

> If yaw rate data 62=zero, then calculated bank angle (new) 50=zero, else calculated bank angle (new) 50=calculated bank angle (old) 50+roll rate data 64*$K$, where $K$=a scale factor calculated by a sample rate=$t$, a bank angle calculation period, and resolution of the motion sensor 82.

In one embodiment, the sample rate t can equal about ten milliseconds, although it is to be appreciated that the sample rate t can be more or less, such as five milliseconds, or twenty milliseconds, or one hundred milliseconds, or one second, depending on the application. In the above equation, the calculation of the bank angle 50 allows for the motion sensor 82 to be zeroed out when the vehicle returns to a horizontal orientation. This simplified approach allows for the calculation of the bank angle without the need for additional motion data measurements, and without requiring significant processing power.

Figure 8:
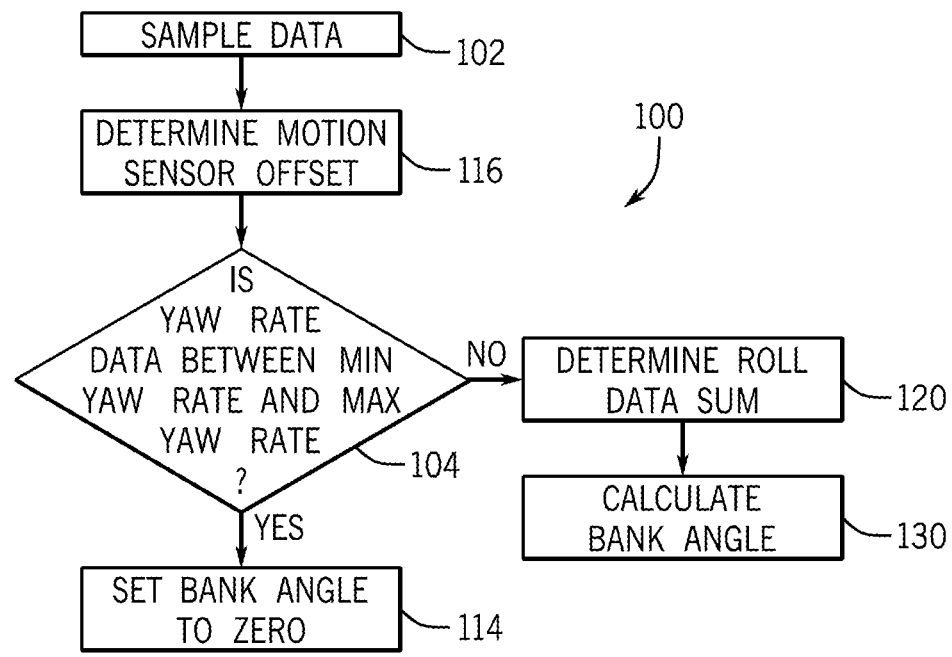
FIG. 8 is a flow chart of a method associated with calculating a bank angle in accordance with the present embodiments.
Figure 9:
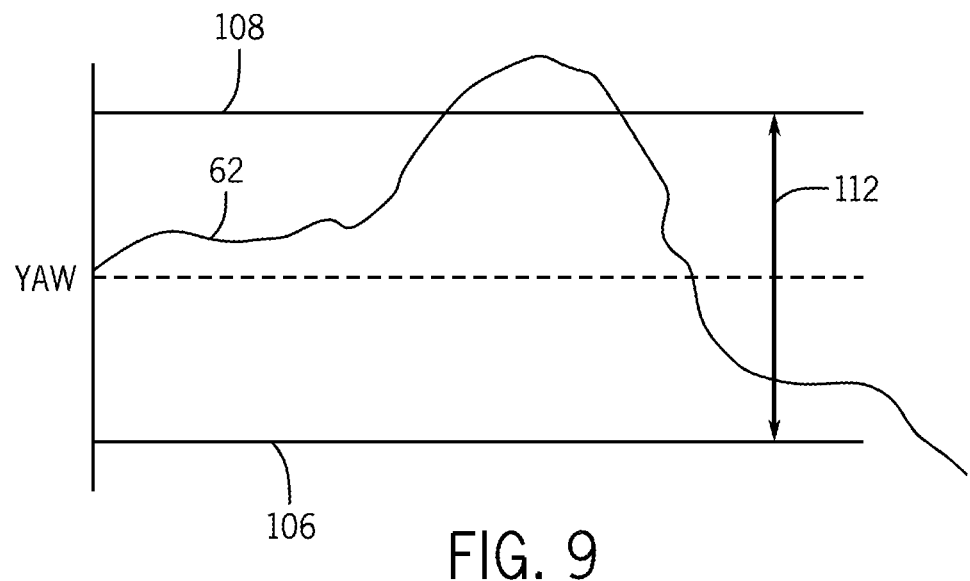
FIG. 9 is a graph of exemplary yaw rate data usable with the method of FIG. 8.

Referring to FIGS. 8 and 9, an exemplary method 100 is shown for calculating the bank angle 50. At process block 102, yaw rate data 62 in degrees per time period can be sampled at a predetermined rate. The predetermined rate can be based off a timer that triggers a read of the motion data, for example. It is to be appreciated that the yaw rate data 62 can be sampled or acquired by many different known methods, and at various sampling rates.

At process block 116, a motion sensor offset 118 can be determined, if available, from a product data sheet, for example. The motion sensor offset 118 can be a predetermined value generated from a factory calibration, for example, or can be a continuously generated value. An actual offset will vary from part to part and over time and temperature. The motion sensor offset 118 can then be provided to the processor 80.

At decision block 104, the yaw rate data 62 can be compared to a predefined minimum yaw rate 106 and a predefined maximum yaw rate 108. The minimum yaw rate 106 and the maximum yaw rate 108 are two of several parameters that can be used to tune the method 100 for any one of a specific motion sensor, vehicle, or sample rate used individually or in any combination. If the yaw rate data 62 is between the minimum yaw rate 106 and the maximum yaw rate 108, the yaw rate data 62 is within an acceptable range 112 where the yaw rate data 62 is determined by the method 100 to indicate that there is no yaw, and accordingly, the vehicle is not turning and therefore the bank angle 50 equals zero or can be set to zero, at process block 114.

When the yaw rate data 62 is not between the minimum yaw rate 106 and the maximum yaw rate 108, then the yaw rate data 62 indicates that the vehicle is turning. At process block 120, a roll data sum 122 can be determined. The roll data sum 122 equals the roll rate data 64 minus the motion sensor offset 118 plus a previous roll data sum 126, if previously determined. At process block 130, the bank angle 50 can then be calculated by multiplying the roll data sum 126 by a scale factor K 132 to produce the bank angle 50 in degrees. For example, when roll data sum 126 equals one hundred degrees per millisecond, and roll rate data 64 equals twenty-two degrees per millisecond, and motion sensor offset 118 equals two degrees per millisecond, roll data sum 126 can be calculated to be one hundred and twenty degrees per millisecond. Multiplying roll data sum by the scale factor K 132 divides out the sample rate to end up with a bank angle in degrees. In this example, roll data sum 126 equals one hundred and twenty degrees per millisecond, and can be multiplied by ½0 millisecond to arrive at a bank angle 50 of six degrees. The method 100 can be repeated at the sampling rate t.

Figure 10:
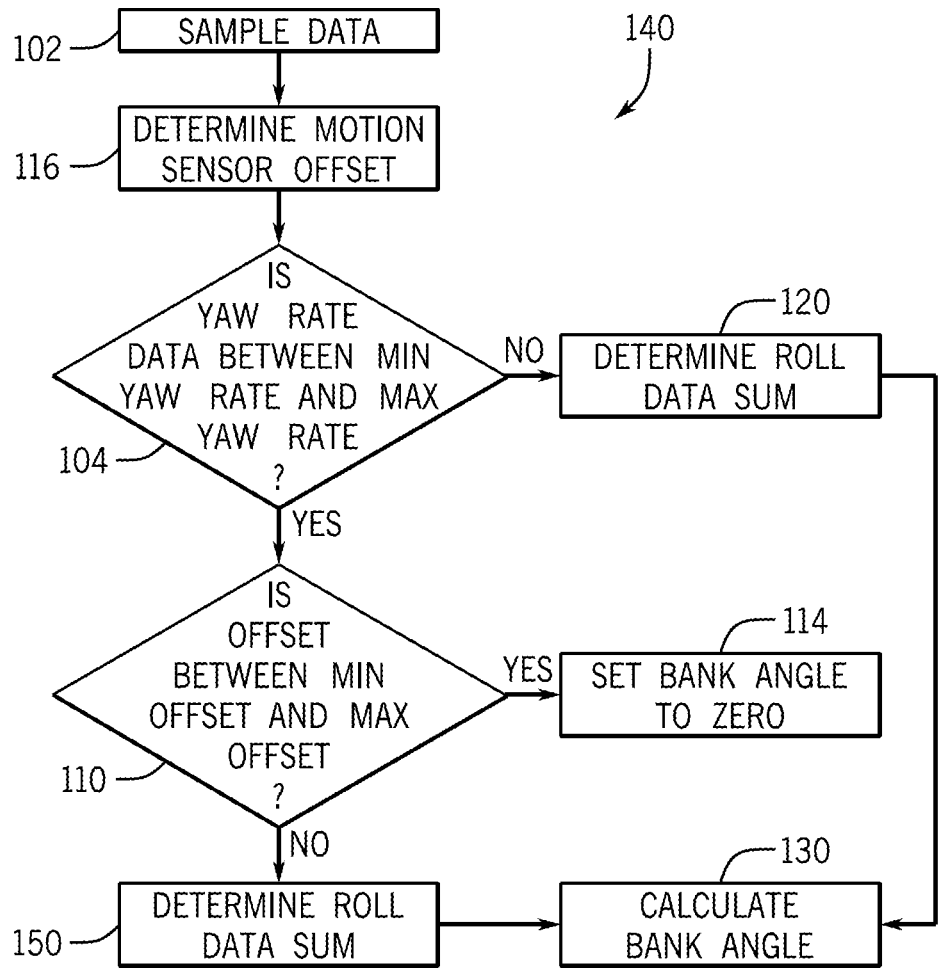
FIG. 10 is a flow chart of an alternative method associated with calculating a bank angle in accordance with the present embodiments.

Referring to FIG. 10, an alternative method 140 for calculating the bank angle 50 is shown. The method 140 is similar to the method 100 of FIG. 8, except in method 140, an initialization process can be included to allow a motion sensor offset determination sufficient time to establish. At decision block 104, if the yaw rate data 62 is between the minimum yaw rate 106 and the maximum yaw rate 108, the yaw rate data 62 is within an acceptable range 112 where the system interprets the yaw rate data 62 to indicate that there is no yaw. Next, at decision block 110, the motion sensor offset 118 can be compared to a predefined minimum offset 142 and a predefined maximum offset 144. The minimum offset 142 and the maximum offset 144 are two more of the several parameters that can be used to tune the method 140 for a specific motion sensor, vehicle, and/or sample rate used.

When the motion sensor offset 118 is not between the minimum offset 142 and the maximum offset 144, the roll data sum 126 can be filtered to smooth the return of the motion sensor offset value to zero. This serves to avoid the immediate calculation of a zero degree bank angle 50 when erroneous data is received that would indicate no yaw, yet the vehicle 52 is in a turn. At process block 150, the roll data sum 126 can be calculated by dividing the roll data sum 126 by a soft zero rate factor 152. The soft zero rate factor 152 is another of the several parameters that can be used to tune the method 140 for a specific motion sensor, vehicle, and/or sample rate used. Next, at process block 130, the bank angle 50 can then be calculated by multiplying the roll data sum 126 by the scale factor 132 to produce the bank angle 50 in degrees.

When the motion sensor offset 118 is between the minimum offset 142 and the maximum offset 144, the motion sensor offset 118 has not yet been sufficiently calculated, so the roll data sum 126 is simply set to zero to compensate for the extra roll data sum error. The method 140 can be repeated at the sampling rate t.

Figure 11:
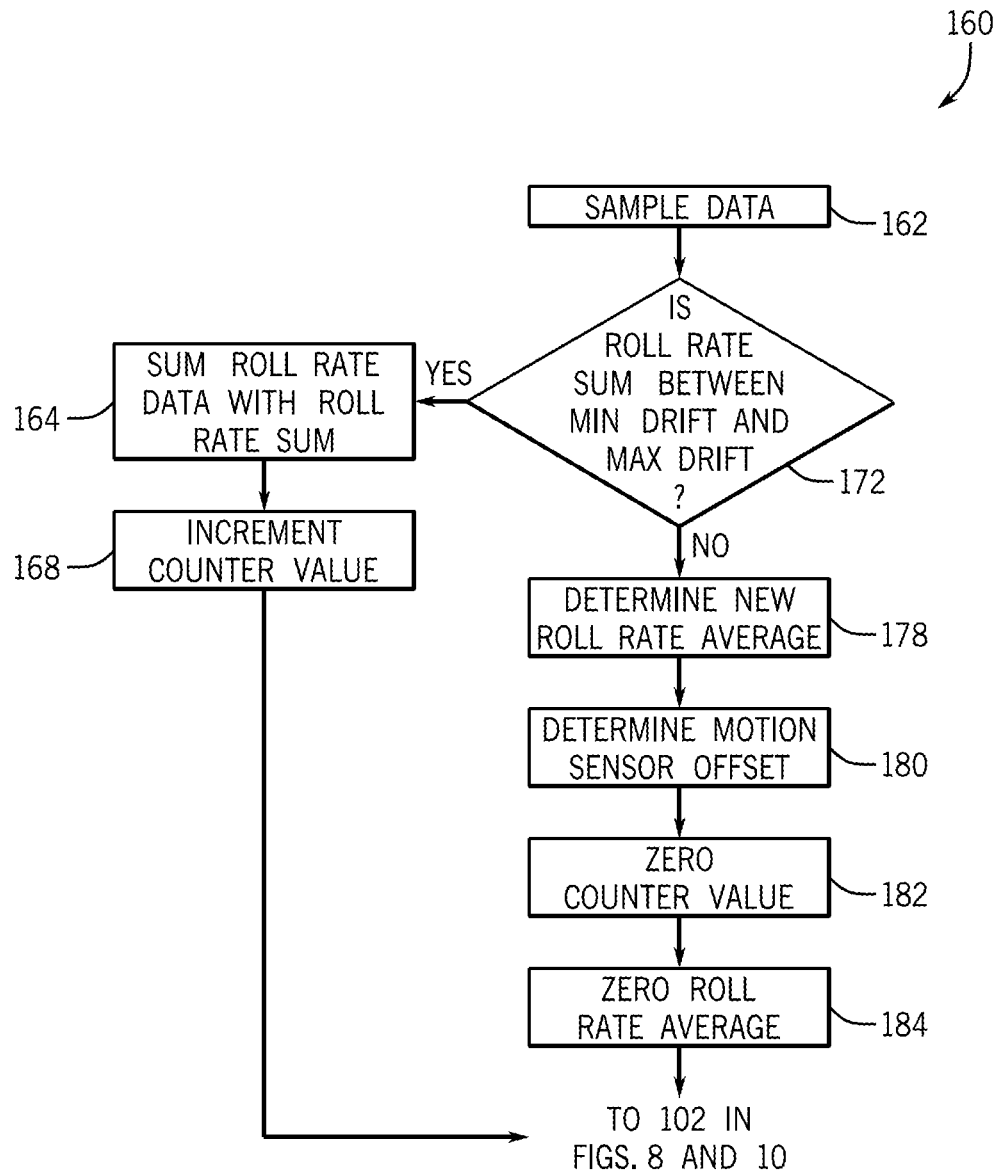
FIG. 11 is a flow chart of a method associated with calculating a motion sensor offset, the motion sensor offset usable by the methods of FIGS. 8 and 10 in accordance with the present embodiments.

Referring to FIG. 11, a method 160 associated with calculating a motion sensor offset 118 is shown. The motion sensor offset 118 can be used with the method 100 of FIG. 8 and the method 140 of FIG. 10. As is known, motion sensors, such as a MEMS gyroscope, include an amount of inherent error, which can be referred to as offset. The method 160 shown in FIG. 11 is used to calculate the motion sensor offset 118 over time so the bank angle calculation can account for the inherent error produced by the motion sensor 82.

Figure 12:
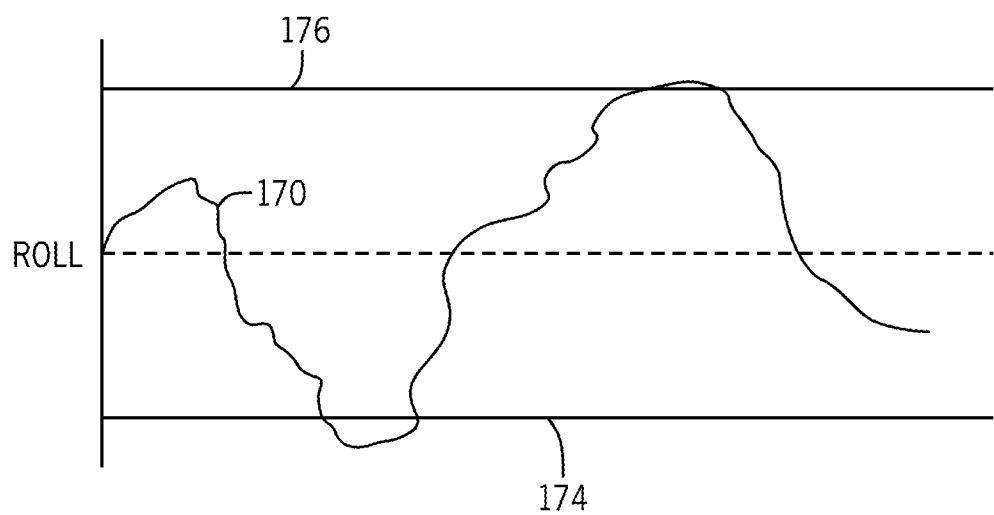
FIG. 12 is a graph of exemplary roll rate average date usable with the method of FIG. 11.

Referring to FIGS. 11 and 12, at process block 162, roll rate data 64 can be sampled at a predetermined rate. The predetermined rate can be based off a timer that triggers a read of the motion data, for example. It is to be appreciated that the roll rate data 64 can be sampled or acquired by many different known methods, and can be averaged over two or more samples. At decision block 172, a roll rate sum value 170 can be compared to a predefined minimum drift 174 and a predefined maximum drift 176. The minimum drift 174 and the maximum drift 176 are two of the several parameters that can be used to tune the method 160 for a specific motion sensor, vehicle, and/or sample rate used.

When the roll rate sum 170 is between the minimum drift 174 and the maximum drift 176, each incrementally sampled roll rate data 64, or every other, or some variation thereof, can be summed with the previous roll rate sum 170, at process block 164. Next at process block 168, the counter value 166 can be incremented. Method 160 can then proceed to either method 100 or method 140.

If the roll rate sum 170 is not between the minimum drift 174 and the maximum drift 176, the roll rate sum 170 is divided by the counter value 166 to produce a roll rate average 171, at process block 178. The motion sensor offset 118 can then be calculated, at process block 180, by adding the new roll rate average 171 to a predetermined value for an offset and then dividing the sum by two. The new roll rate average 171 can be averaged with the prior roll rate average 171 to limit the amount of change within each sampling cycle. If desired, the number of samples used to average the motion sensor offset 118 can be changed, which would increase or decrease the speed of the motion sensor offset update. It is to be appreciated that this is but one filtering technique, and there are other filtering techniques that could be used. Continuing at process block 182, the counter value 166 can then be zeroed and the roll rate sum 170 can then be zeroed at process block 184. Method 160 can then proceed to either method 100 or method 140.

Figure 13:
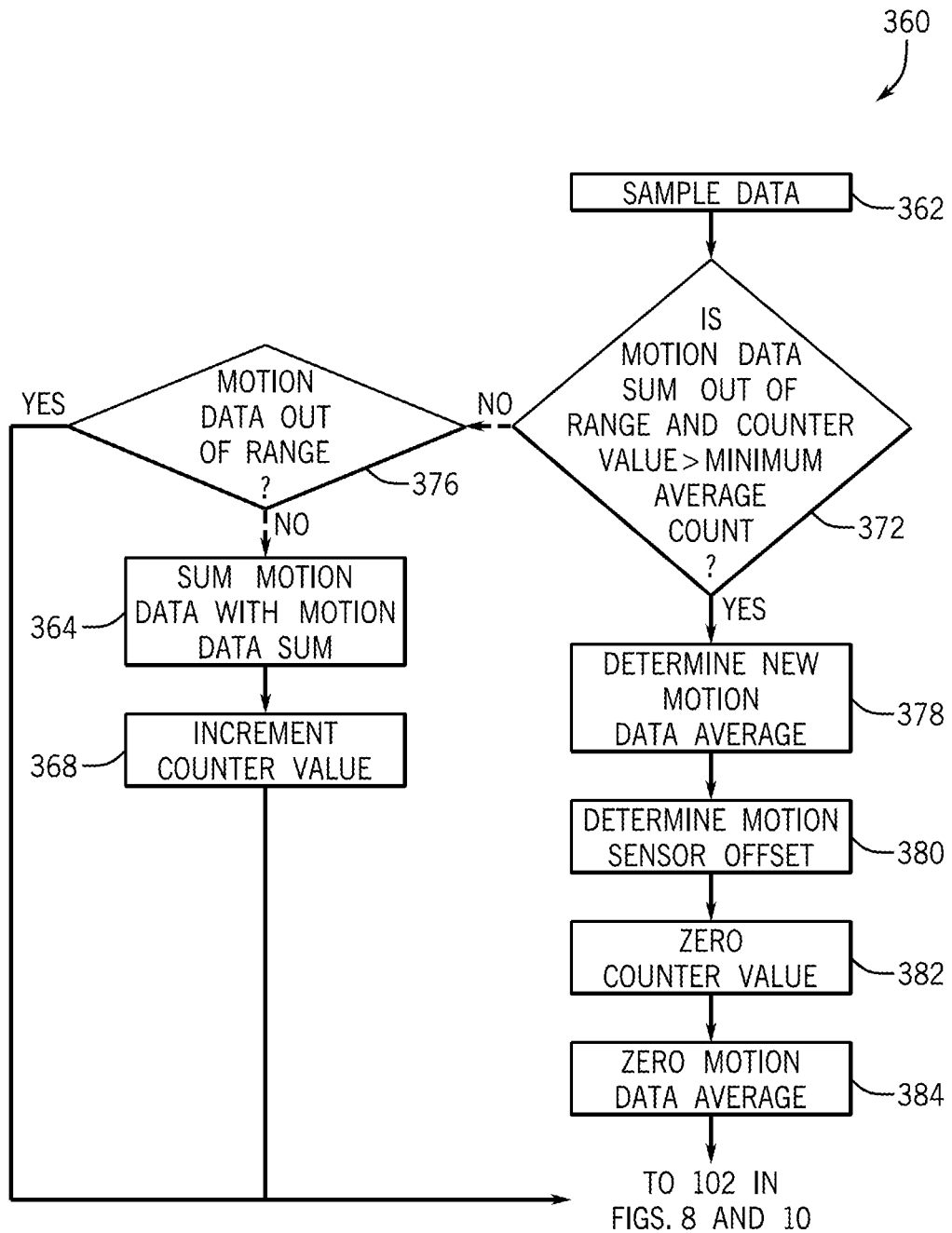
FIG. 13 is a flow chart of an alternative method associated with calculating a motion sensor offset, the motion sensor offset usable by the methods of FIGS. 8 and 10 in accordance with the present embodiments.

Referring to FIG. 13, an alternative embodiment of a method 360 associated with calculating a motion sensor offset 118 is shown. As with the method 160 of FIG. 11, the motion sensor offset 118 can be used with the method 100 of FIG. 8 and the method 140 of FIG. 10. The method 360 can be used to calculate the motion sensor offset 118 over time so a motion related calculation can account for the inherent error produced by the motion sensor 82.

At process block 362, motion data 64 can be sampled at a predetermined rate. The predetermined rate can be based off a timer that triggers a read of the motion data, for example, or the motion data 64 can be sampled or acquired by many different known methods, and can be averaged over two or more samples.

At decision block 372, it can be determined if a motion data sum 370 is outside of a predetermined range (e.g., is x>x(max) or is x<x(min)) and if counter value 166 is greater than a minimum average counter value 374. The x(max) and the x(min) are two of the several parameters that can be used to tune the method 360 for a specific motion sensor, vehicle, and/or sample rate used. Motion data sum 370 can comprise data from any axis, and the method 360 can be used for any axis.

When the motion data sum 370 is not outside of the predetermined range and the counter value 166 is not greater than a minimum average counter value 374, at decision block 376, it can be determined if the motion data 64 is outside of a predetermined range. Decision block 376 is an optional step and can be included to help limit the motion data sum 370 and improve the speed of the motion sensor offset calculation. When decision block 376 is included, if the motion data 64 is outside of the predetermined range, then the motion data 64 can be determined to be actual motion data, and method 360 can proceed to either method 100 or method 140. If the motion data 64 is not outside of the predetermined range, then method 360 can proceed to process block 364. When optional decision block 376 is not included in method 360, and the motion data sum 370 is not outside of the predetermined range and the counter value 166 is not greater than a minimum average counter value 374, method 360 can proceed to process block 364.

At process block 364, the latest motion data 64 can be added the motion data sum 370. Optionally, the motion sensor offset 118 can be subtracted from the motion data 64. Tracking the difference in offset helps limit how often the motion sensor offset 118 is updated when there is a small difference between a calculated offset and the actual offset of the sensor. Next at process block 368, the counter value 166 can be incremented. Method 360 can then proceed to either method 100 or method 140.

When the motion data sum 370 is outside of the predetermined range and the counter value 166 is greater than a minimum average counter value 374, the motion data sum 370 can be divided by the counter value 166, and optionally the motion sensor offset 118 can be added, to produce a new motion data average 371, at process block 378. The motion sensor offset 118 can then be calculated, at process block 380, by adding the new motion data average 371 to a predetermined value for an offset and then dividing the sum by two. The new motion data average 371 can be averaged with the prior motion data average 371 to limit the amount of change within each sampling cycle. If desired, the number of samples used to average the motion sensor offset 118 can be changed, which would increase or decrease the speed of the motion sensor offset update. It is to be appreciated that this is but one filtering technique, and there are other filtering techniques that could be used. Continuing at process block 382, the counter value 166 can then be zeroed and the motion data sum 370 can then be zeroed at process block 384. Method 360 can then proceed to either method 100 or method 140.

In some embodiments, the roll rate average 171 can be stored in memory 92. In some embodiments the memory is non-volatile memory 92, and maintaining the roll rate average 171 in non-volatile memory 92 can be beneficial to provide the method 160 with a larger amount of samples over time to better account for the inherent error produced by the motion sensor 82. If the roll rate average 171 is not saved in non-volatile memory 92, each time the vehicle is powered down, and then powered back up, the roll rate average 171 calculation can go through several data samples before the roll rate average 171 and associated counter value 166 produced a useful roll rate average.

Figure 14:
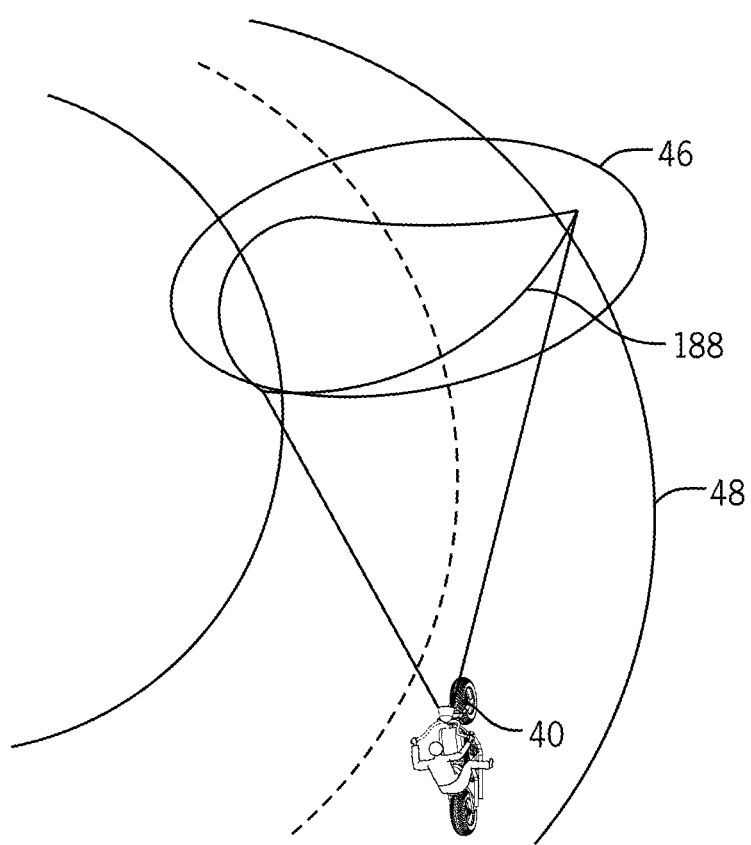
FIG. 14 is similar to FIG. 2, except that the illumination pattern generated by the motorcycle's headlight is enhanced to provide improved illumination through the curve.
Figure 15:
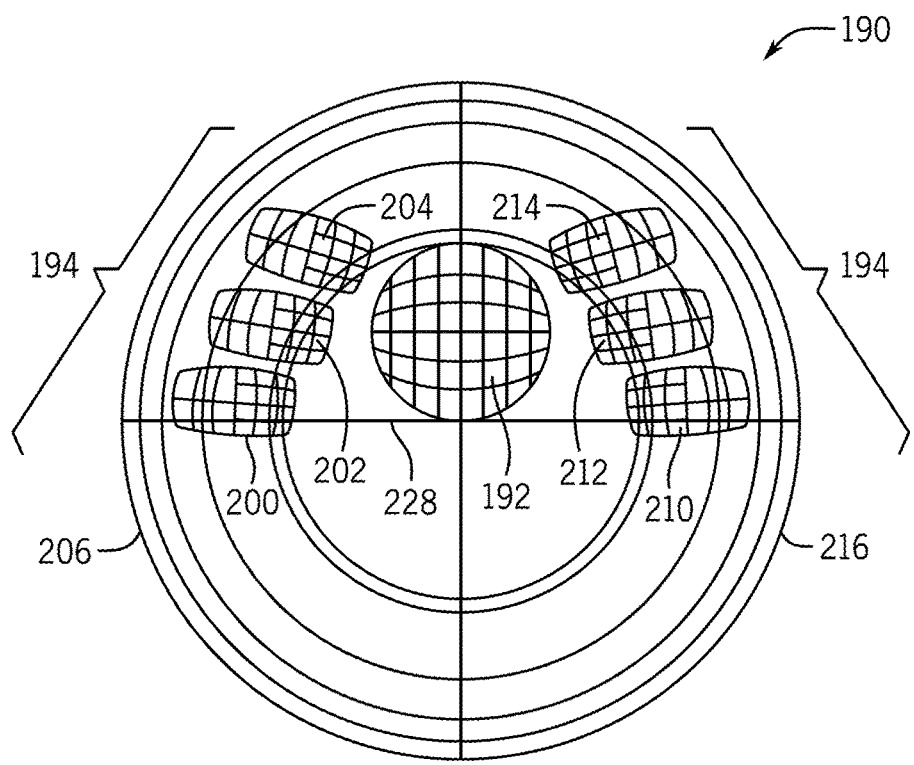
FIG. 15 is a front plan view of a headlight in accordance with the present embodiments.
Figure 16:
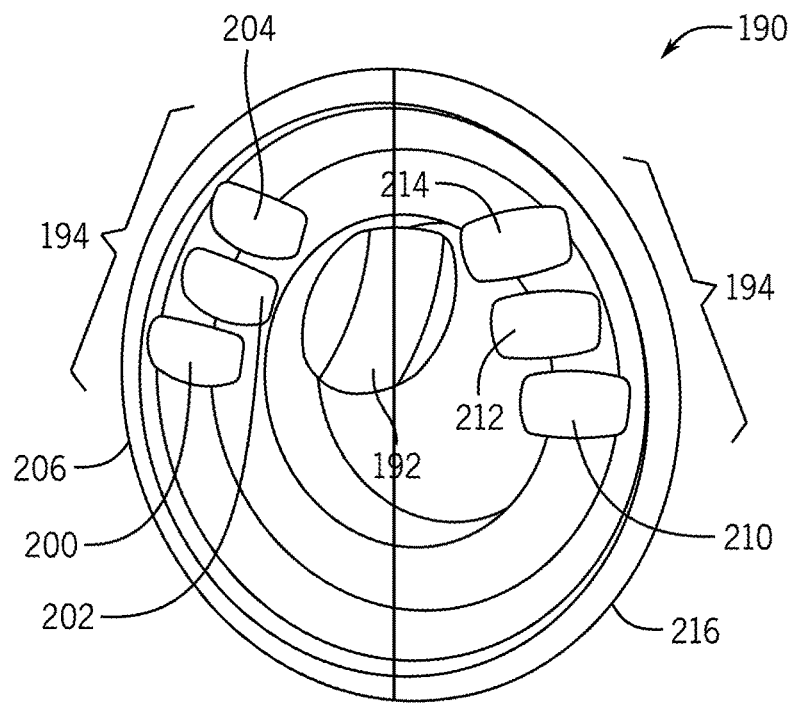
FIG. 16 is a perspective view of the headlight shown in FIG. 15.

After methods 100 or 140 calculate a bank angle 50, an illumination source, e.g., a headlight according to the present technology, can be controlled to provide an improved illumination pattern during a vehicle bank. Referring to FIG. 14, the motorcycle 40 on the curved road 48 can provide an improved illumination pattern 188 where additional illumination is provided to generally maintain a horizontal illumination pattern in the driver's line of sight area 46.

Referring now to FIGS. 15-18, an embodiment of a headlight 190 controllable to provide an improved illumination pattern during a vehicle bank is shown in several orientations. In this embodiment, the headlight 190 can be sized and shaped to allow the headlight to fit within the volume of a predetermined sealed beam lamp. For example, motorcycles are known to use standard PAR56 sealed beam headlights, although custom sizes and shapes are contemplated. The headlight 190 can include a primary illumination group 192 and a plurality of side illumination groups 194. In some embodiments, lenses and/or reflectors can be used to enhance or reflect illumination. Illumination groups 192 and 194 can include a single illumination source, or a plurality of illumination sources. An illumination source can include any known or future developed Illumination source, including tungsten halogen, HID, LED, emissive surface, and laser as non-limiting examples. In the embodiment shown, three side illumination groups 200, 202, 204 are shown on a left side 206 (looking at the headlight 190), and three side illumination groups 210, 212, 214 are shown on a right side 216 of the headlight 190, although, more or less are contemplated.

Figure 17:
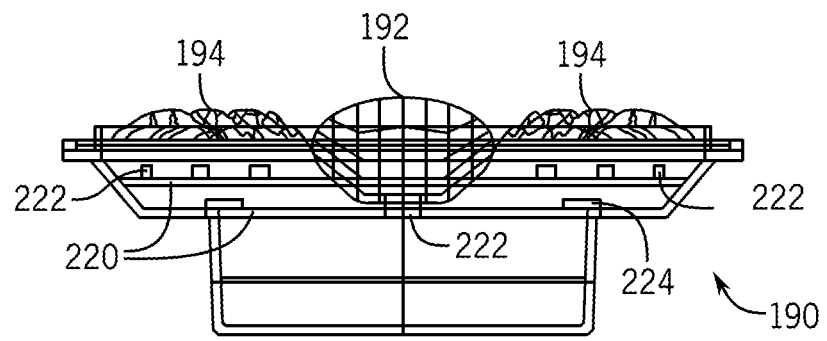
FIG. 17 is a top plan view of the headlight shown in FIG. 15.
Figure 18:
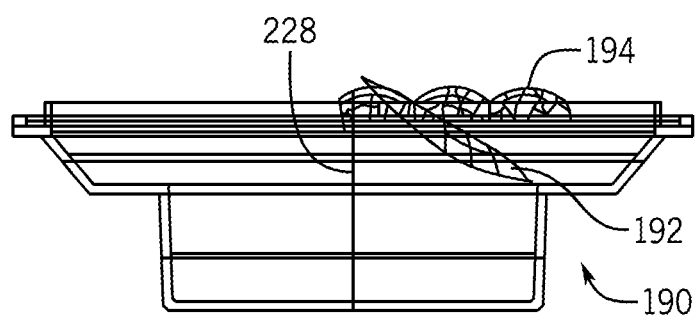
FIG. 18 is a side plan view of the headlight shown in FIG. 15.
Figure 19:
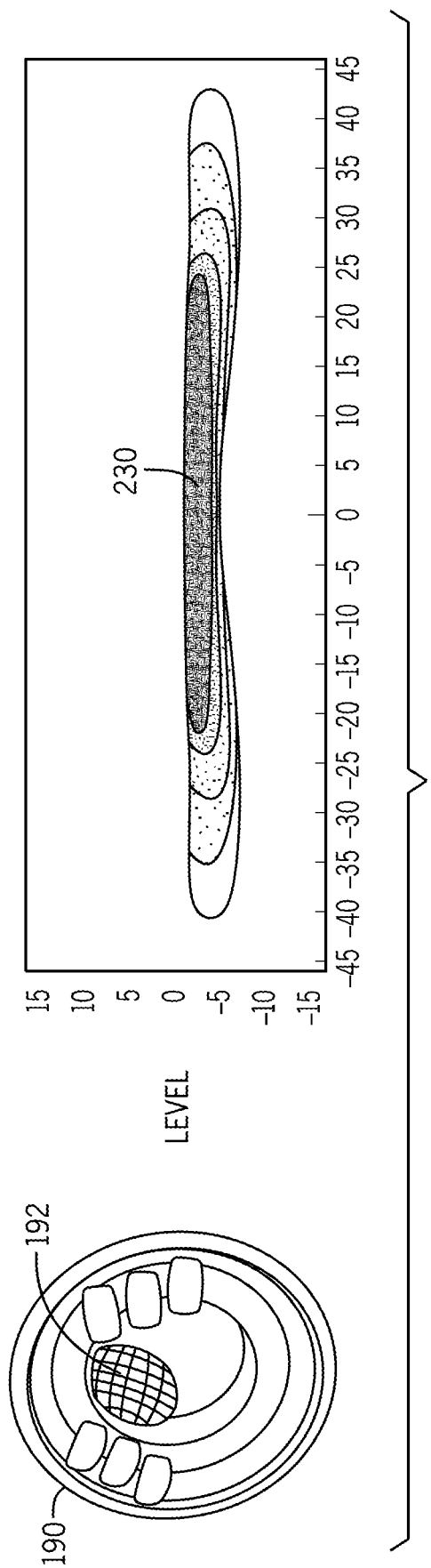
FIGS. 19-22 are views showing the illumination projection from the headlight shown in FIG. 15 at various bank angles.

It is to be appreciated that more than one headlamp can be used to achieve the features described herein. For example, the side illumination groups 200, 202, 204 as described as being on the left side can be in one headlamp, side illumination groups 210, 212, 214 as described as being on the right side can be in another headlamp, and the primary illumination group 192 can be in yet another headlamp. As best seen in FIG. 17, the headlight 190 can include a driver board 220 that includes the illumination sources 222 and illumination source drivers 224. The illumination source drivers 224 can be analog or digital, and can be included for low beam illumination, high beam illumination, and banking illumination.

In one embodiment, side illumination groups 200 and 210 can be spaced or rotated off of horizontal 228 by five degrees, side illumination groups 202 and 212 can be rotated off of horizontal 228 by ten degrees, and side illumination groups 204 and 214 can be rotated off of horizontal 228 by fifteen degrees. The rotation off of horizontal for a motorcycle that has a greater bank angle can extend higher, e.g., twenty degrees, or thirty degrees, or forty-five degrees, as non-limiting examples. It is to be appreciated that rotation off of horizontal can range anywhere between zero and ninety degrees, and the rotation can be both above horizontal and below horizontal 228. Further, rotation off of horizontal 228 can be linear, e.g., five, ten, fifteen degrees, or rotation off of horizontal 228 can be exponential, e.g., two, four, eight, sixteen, thirty-two degrees, or a combination of both linear and exponential.

Figure 20:
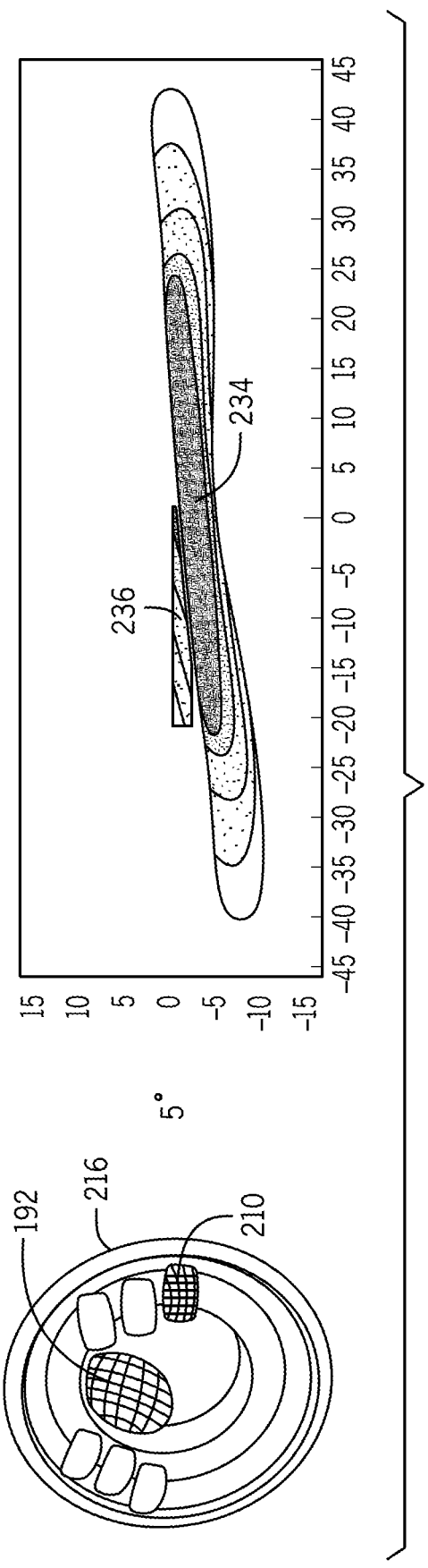

Referring to FIGS. 19-22, improved illumination projections from the headlight 190 are shown. The headlight is generally level, or horizontal, in FIG. 19, and the associated illumination projection 230 is also generally level. Only the primary illumination group 192 is energized to produce the illumination projection 230. In FIG. 20, the headlight 190 is simulating a five degree left bank (of a motorcycle, for example). The primary illumination group 192 is energized, along with side illumination group 210 on the right side 216. As can be seen in the illumination projection 234, illumination from the primary illumination group 192 is angled at generally five degrees, and illumination projection 236 from the side illumination group 210 remains generally horizontal, and provides illumination for the space above and to the left of center of the angled illumination projection 234 from the primary illumination group 192. The added illumination projection 236 from the side illumination group 210 provides the improved illumination pattern to generally maintain a horizontal illumination pattern in the driver's line of sight area.

Figure 21:
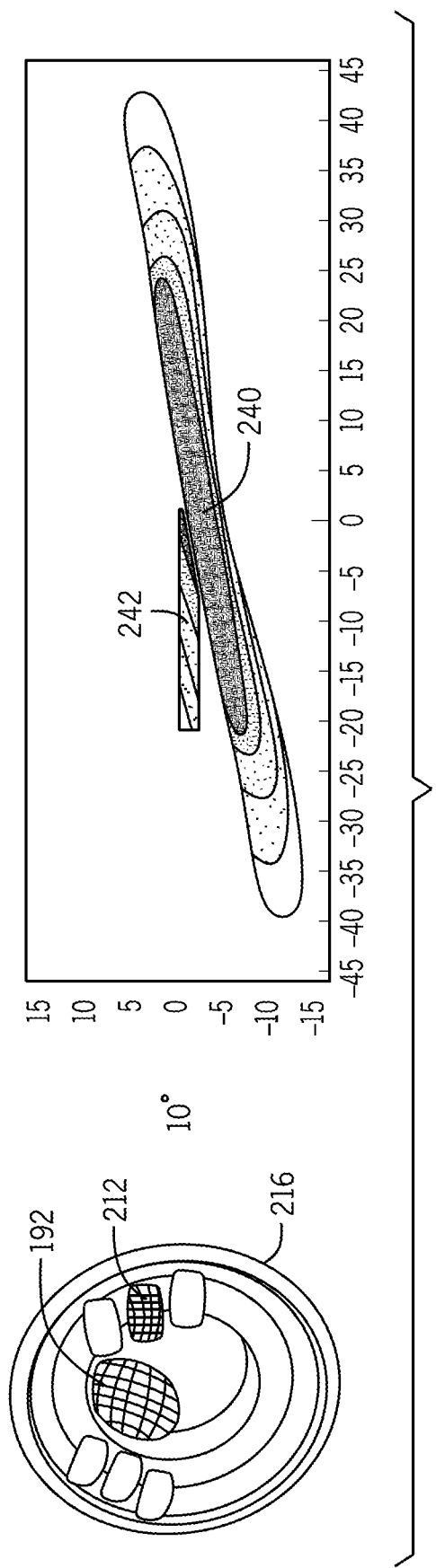
Figure 22:
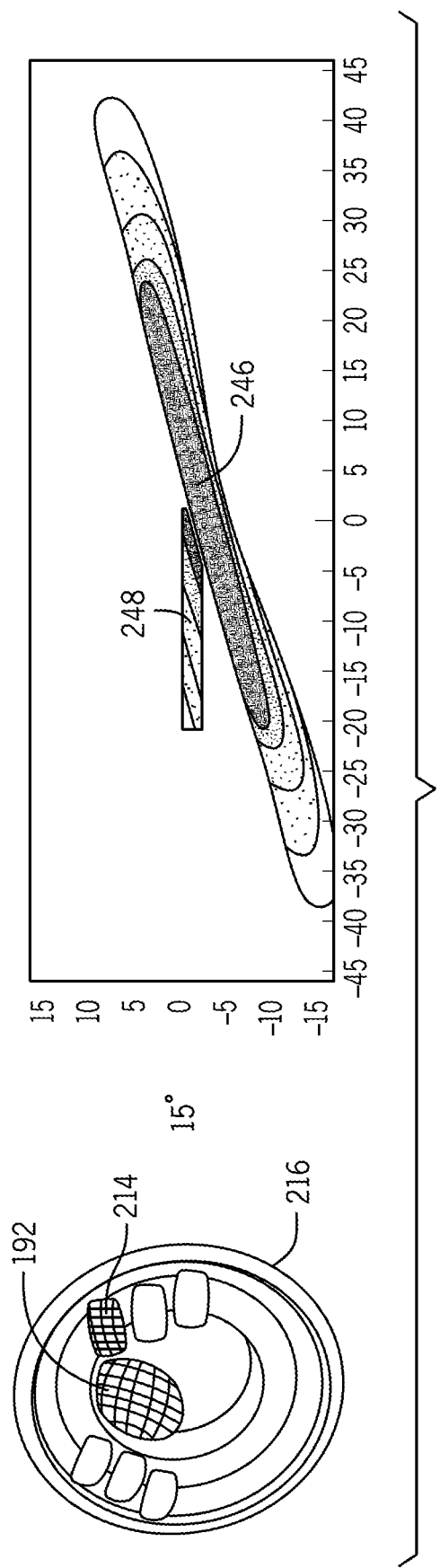
Figure 23:
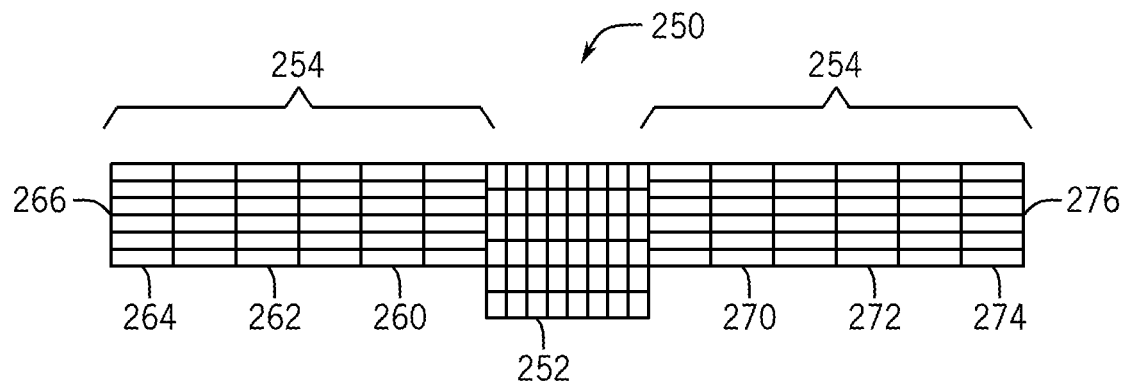
FIG. 23 is a front plan view of an alternative embodiment of a headlight in accordance with the present embodiments.
Figure 24:
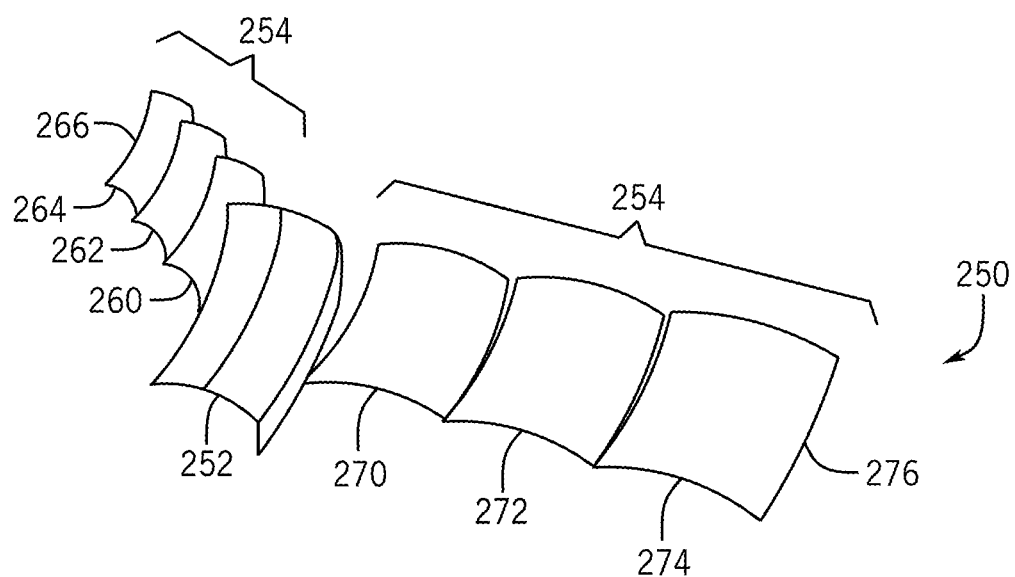
FIG. 24 is a perspective view of the headlight shown in FIG. 23.

The results are similar for FIGS. 21 and 22. In FIG. 21, the headlight 190 is simulating a ten degree left bank. The primary illumination group 192 is energized, along with side illumination group 212 on the right side 216. As can be seen in the illumination projection 240, illumination from the primary illumination group 192 is angled at generally ten degrees, and illumination projection 242 from the side illumination group 212 remains generally horizontal, and provides illumination for the space above and to the left of center of the angled illumination projection 240 from the primary illumination group 192.

In FIG. 22, the headlight 190 is simulating a fifteen degree left bank. The primary illumination group 192 is energized, along with side illumination group 214 on the right side 216. As can be seen in the illumination projection 246, illumination from the primary illumination group 192 is angled at generally fifteen degrees, and illumination projection 248 from the side illumination group 214 remains generally horizontal, and provides illumination for the space above and to the left of center of the angled illumination projection 246 from the primary illumination group 192.

In FIGS. 20-22, only one side illumination group on one side of the headlight 190 is shown energized. It is to be appreciated that one or more of the side illumination groups can be illuminated at any particular bank angle, and that one or more illumination groups can be illuminated on either or both the right side and the left side for a left bank and a right bank to fill in more or less of an illumination projection.

Figure 25:
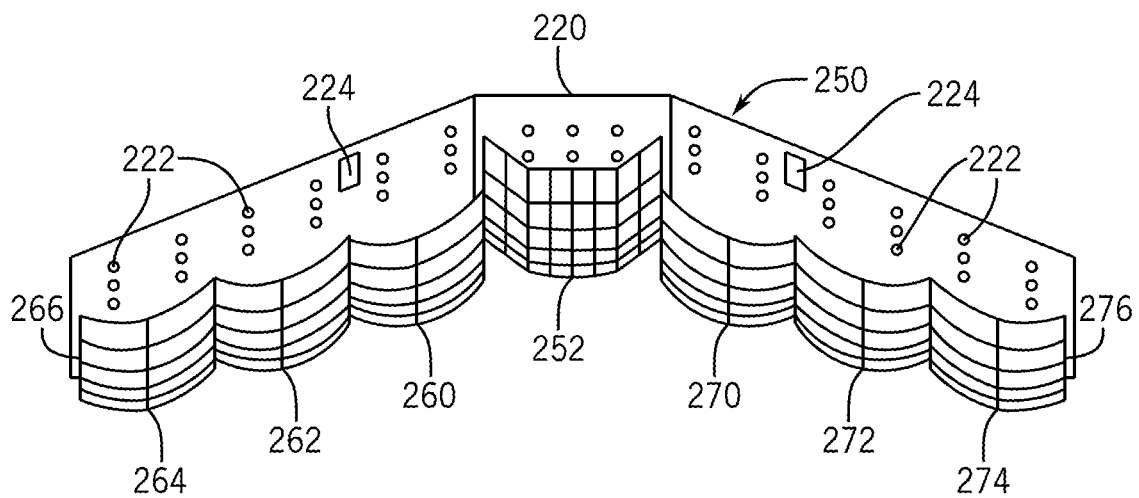
FIG. 25 is a top plan view of the headlight shown in FIG. 23.
Figure 26:
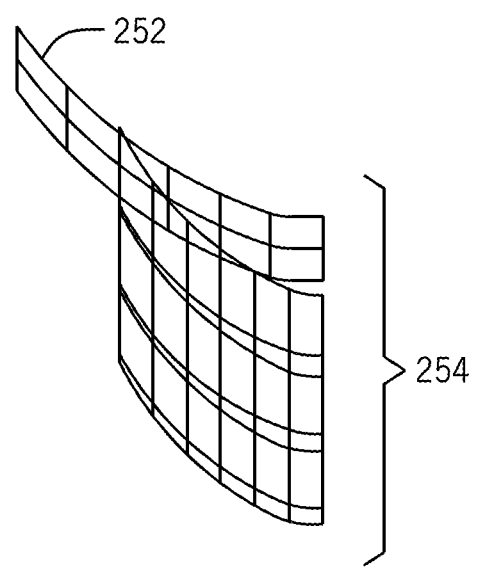
FIG. 26 is a side plan view of the headlight shown in FIG. 23.

Referring now to FIGS. 23-26, an embodiment of a headlight 250 controllable to provide an improved illumination pattern during a vehicle bank is shown in several orientations. Any of the features described above with reference to FIGS. 15-22 are contemplated with this embodiment. In this embodiment, the headlight 250 can be sized and shaped to fit within or on the fairing of a motorcycle, for example. The headlight 250 can include a primary illumination group 252 and a plurality of side illumination groups 254. The illumination groups 252 and 254 can reflect illumination from a single illumination source or a plurality of illumination sources. In some embodiments, lenses can also be used to enhance or reflect illumination. In the embodiment shown, three side illumination groups 260, 262, 264 are shown on a left side 266 (looking at the headlight), and three side illumination groups 270, 272, 274 are shown on a right side 276 of the headlight 250, although, more or less are contemplated. As best seen in FIG. 25, the headlight 250 can include a driver board 220 that includes the illumination sources 222 and illumination source drivers 224. The illumination source drivers 224 can be analog or digital, and can be included for low beam illumination, high beam illumination, and banking illumination.

In some embodiments, side illumination groups 260 and 270 can move the illumination cutoff into the turn at five degrees, side illumination groups 262 and 272 can move the illumination cutoff into the turn at ten degrees, and side illumination groups 264 and 274 can move the illumination cutoff into the turn at fifteen degrees.

Referring to FIGS. 27-30, improved illumination projections from the headlight 250 are shown. Similar to FIGS. 19-22, in FIG. 27, the headlight 250 is level, and the associated illumination projection 280 is also generally level. Only the primary illumination group 252 reflects illumination from an illumination source to produce the illumination projection 280. In FIG. 28, the headlight 250 is simulating a five degree left bank (of a motorcycle, for example). The primary illumination group 252 is energized, along with side illumination group 270 on the right side 276. As can be seen in the illumination projection 282, illumination from the primary illumination group 252 is angled at generally five degrees, and illumination projection 284 from the side illumination group 270 remains generally horizontal, and provides illumination for the space above and to the left of center of the angled illumination projection 282 from the primary illumination group 252. The added illumination projection 284 from the side illumination group 270 provides the improved illumination pattern to generally maintain a horizontal illumination pattern in the driver's line of sight area.

The results are similar for FIGS. 29 and 30. In FIG. 29, the headlight 250 is simulating a ten degree left bank. The primary illumination group 252 is energized, along with side illumination group 272 on the right side 276. As can be seen in the illumination projection 290, illumination from the primary illumination group 252 is angled at generally ten degrees, and illumination projection 292 from the side illumination group 272 remains generally horizontal, and provides illumination for the space above and to the left of center of the angled illumination projection 290 from the primary illumination group 252.

In FIG. 30, the headlight 250 is simulating a fifteen degree left bank. The primary illumination group 252 is energized, along with side illumination group 274 on the right side 276. As can be seen in the illumination projection 294, illumination from the primary illumination group 252 is angled at generally fifteen degrees, and illumination projection 296 from the side illumination group 274 remains generally horizontal, and provides illumination for the space above and to the left of center of the angled illumination projection 294 from the primary illumination group 252.

Similar to FIGS. 20-22, in FIGS. 28-30, only one side illumination group on one side of the headlight 250 is shown as reflecting illumination from an illumination source. It is to be appreciated that one or more of the side illumination groups can reflect illumination at any particular bank angle, and that one or more illumination groups can be illuminated on either or both the right side and the left side for a left bank and a right bank to fill in more or less of an illumination projection. The examples provided of fifteen degrees are exemplary only. Other vehicles, such as a sports bike that can take turns at high degrees of bank may extend illumination forty-five degrees or more or less.

In some embodiments, in addition to calculating the bank angle 50 in order to provide an improved illumination pattern during a vehicle bank as described above, the pitch rate data 60 from the IMU 56 can be used to provide an improved illumination pattern when the vehicle is pitching either up or down due to a hill in the road, for example. As can be seen in FIG. 25, a headlight can include one or more rows of illumination sources 222. Each row can be controlled, alone or in combination with lenses or reflectors to provide an improved illumination pattern generally in front of the vehicle to maintain illumination on the road while the vehicle is pitching. Further, the improved illumination pattern during a vehicle bank can be combined with the improved illumination pattern while the vehicle is pitching.

One important aspect of at least some embodiments of the present invention is that the vehicle electronics 70 can allow the illumination source to be modulated using pulse width modulation (PWM) or other known modulation techniques to a predetermined or calculated level so that the illumination source can be smoothly turned on and off to avoid the driver's perception of individual illumination sources being turned on or off at full capacity. For example, when a bank angle is calculated to be at four degrees, the five degree element, e.g., side illumination groups 200 and 210, or side illumination groups 260 and 270, can be controlled to illuminate at eighty percent of its full intensity.

In one embodiment, side illumination groups 200 and 210, or side illumination groups 260 and 270, can be controlled to illuminate in a range anywhere between zero and one hundred percent of full intensity per degree of bank. Further, control of the illumination can be linear, e.g., twenty, forty, sixty, etc., percent of illumination per degree of bank, or control of the illumination can be exponential, e.g., ten, twenty, forty, eighty percent of illumination, or a combination of both linear and exponential.

Figure 31:
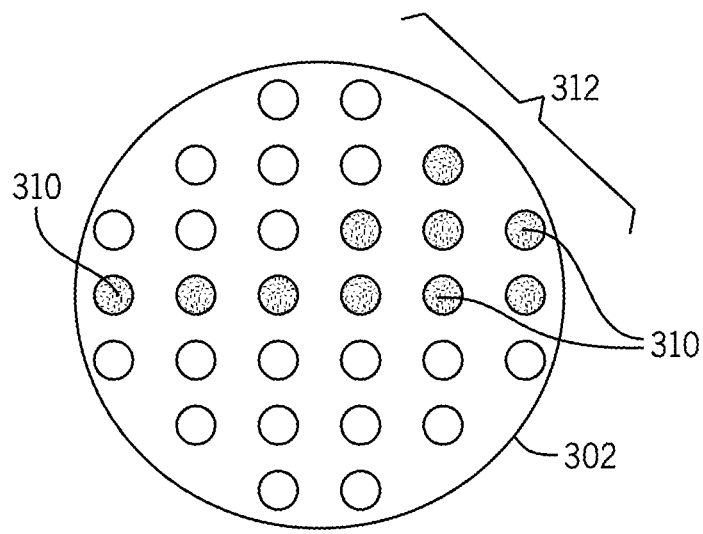
FIGS. 31-33 are front plan views of alternative embodiments for a headlight, and showing various patterns of illuminated illumination sources to provide various improved illumination projection patterns.
Figure 32:
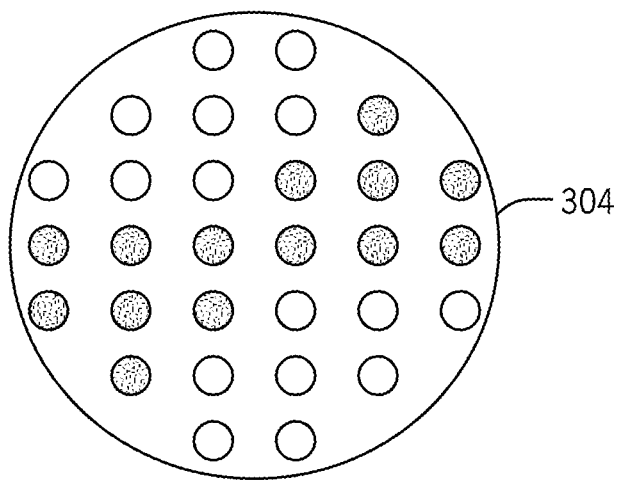
Figure 33:
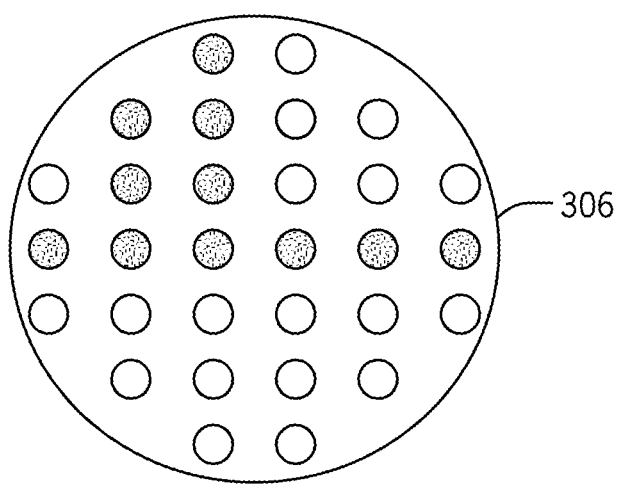

As previously identified, single, dual, multi element illumination sources, and emissive projection technologies are considered within the scope of the invention. For example, one embodiment could include an array of LEDs or an emissive projector that can be controlled to illuminate a pattern of illumination sources, as shown in FIGS. 31-33, as non-limiting examples, to provide various improved illumination projection patterns 302, 304, 306 respectively. For example, illumination projection pattern 302 shows several illuminated LEDs 310 illuminated in a horizontal line, along with several more illuminated LEDs 310 in an upper right quadrant 312. In addition, the shape of an LED array or emissive projector, for example, can be optimized to provide desired illumination patters for specific vehicles and specific operating conditions. The structure of the illumination source can be flat, convex, concave, or combinations, to provide optimized illumination patters.

In some embodiments, the processor 80 can be configured to control other vehicle operations when a bank angle is calculated, and/or when a bank angle of zero is determined. For example, it can be advantageous to turn on a blinker or a side light 350 (see FIGS. 3 and 5) to further provide additional focused illumination for particular vehicle maneuvers, such as when a vehicle is parking, or when a vehicle is making a sharp turn at a street corner. Similarly, a blinker or a side light, for example, can be automatically turned off based on a calculated bank angle, and/or when a bank angle of zero is determined. It is to be appreciated that the processor 80 can be configured to control non-illumination related vehicle operations as well. For example, when a bank angle is calculated, vehicle shocks or vehicle steering functions can be adjusted according to the calculated bank angle.

In other embodiments, processor 80 can be configured to control one or a plurality of illumination patterns. Examples of illumination patterns can include a vehicle start-up pattern, a vehicle shutdown pattern, a vehicle parked pattern, a pattern when a vehicle horn is honked, a vehicle operator initiated pattern, and different patterns for a left headlight and a right headlight, etc. The illumination patterns can be stored in memory 186. The illumination pattern can be primarily meant for entertainment, and not for specific illumination for vehicle operation. The illumination pattern can be initiated when the vehicle is powered up and/or turned off. It is to be appreciated that the illumination pattern can be initiated at other times as well, such as when the vehicle is not moving, or daylight when the headlight illumination is not required. For example, the illumination sources could be controlled to ramp up and down in illumination intensity for several seconds and/or through several cycles, and/or the illumination sources could be controlled to illuminate in a circular fashion so it appears that the illumination is chasing its own tail. The configuration of illumination patterns are only limited by the particular configuration of the illumination sources. The illumination pattern can be preprogrammed when the headlight is manufactured, or, the illumination pattern can be user programmable.

In yet other embodiments, a user can control and/or configure and/or customize headlight options, including illumination patterns and other illumination functions. For example, an application, i.e., and "App" can be provided to a user. The App can be cell phone/smart device based or HTML web based, or both, as non-limiting examples. In addition, a key fob or other remote device can include control and/or configuration capabilities. These control and/or configuration options can provide remote control/configuration and/or wireless control and/or configuration of headlight options using a wireless communication option 90, or with connectivity through the USB port 88, or both.

In some embodiments, headlight options can be licensed or provided as a pay-as-you-go feature. For example, a user may only want to enable the custom illumination pattern function when the vehicle is going to be in a parade, or a show of some sort. Again, using an App or a web site provided to a user, and with connectivity through the USB port 88, or a wireless communication option 90, as a non-limiting examples, the user with a cell phone or other smart device can control and/or configure and/or create custom illumination patters, e.g., whatever function was licensed or pre-paid for. Further, the functions paid for can be disabled after a predetermined amount of time, i.e., the amount of time paid for. Other headlight options that can be made available via a license or as a pay-as-you-go feature include the improved illumination pattern during a vehicle bank, the ability to control a booster for a high or low beam, or any other controllable headlight function, as non-limiting examples.

It is to be appreciated that the embodiments described herein may include other elements such as covers, lenses, reflectors, baffles, motors, solenoids, and surface arrangements, all for the purpose of controlling and/or adjusting the illumination projection from a headlight arrangement. It is also to be appreciated that the embodiments described herein contemplate use in a low beam mode and a high beam mode.

Although the present technology has been described with reference to preferred embodiments, workers skilled in the art will recognize that changes may be made in form and detail without departing from the spirit and scope of the technology. For example, the present technology is not limited to headlight illumination for a motorcycle and may be practiced with other vehicles that require control of illumination. In addition, alone, or in combination with the embodiments described herein, additional embodiments can include one or more illumination sources that are controlled to stay horizontal during a bank, so as to continually produce a horizontal illumination pattern, even during a bank.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A headlight system for a vehicle comprising:
   a motion sensor configured to sample motion data;
   an illumination source including an array of illumination elements;
   a processor configured to control an illumination pattern provided by the illumination source in response to a bank angle value output by a bank angle calculation, during the bank angle calculation, the processor being configured to:

sample the motion data from the motion sensor;
compare the motion data to a predefined minimum motion value and a predefined maximum motion value;
when the motion data is between the predefined minimum motion value and the predefined maximum motion value, soft average the bank angle value toward zero; and
when the motion data is not between the predefined minimum motion value and the predefined maximum motion value, calculate the bank angle value.

2. The headlight system of claim 1, wherein the motion data includes yaw axis data.

3. The headlight system of claim 2, wherein the motion data includes yaw rate data.

4. The headlight system of claim 3, wherein the processor configured to soft average the bank angle value toward zero when the yaw rate data is between a predefined minimum yaw rate and a predefined maximum yaw rate.

5. The headlight system of claim 3, wherein the processor is further configured to receive a motion sensor offset value.

6. The headlight system of claim 5, the processor further being configured to determine a roll data sum equal to a roll rate data value minus the motion sensor offset value when the yaw rate data is not between the predefined minimum yaw rate and the predefined maximum yaw rate.

7. The headlight system of claim 1, wherein the bank angle value is calculated by taking the product of a roll rate data value and a scale factor, and adding a previous bank angle value; and
wherein the scale factor is based on a sample rate, a bank angle calculation period, and a resolution of the motion sensor.

8. The headlight system of claim 1, wherein during the bank angle calculation, the processor is further configured to:
sample roll rate data provided by the motion sensor;
compare a roll rate sum value to a predefined minimum drift and a predefined maximum drift, and when the roll rate sum value is between the predefined minimum drift and the predefined maximum drift, determine a current roll rate sum value by adding the sampled roll rate data to a previous roll rate sum value, and then increment a counter value; and
when the roll rate sum value is not between the predefined minimum drift and the predefined maximum drift, divide the current roll rate sum value by the counter value to produce a new roll rate average, add the new roll rate average to a predetermined value for an offset and then divide the sum by two to calculate a motion sensor offset.

9. An apparatus for calculating a bank angle value of a vehicle, the apparatus comprising:
an inertial measurement unit, the inertial measurement unit including a processor and at least one motion sensor operatively coupled to the processor;
the processor programmed to:
sample motion data at a predetermined rate, the motion data provided by the at least one motion sensor;
compare the motion data to a predefined minimum motion rate and a predefined maximum motion rate;
when the motion data is between the predefined minimum motion rate and the predefined maximum motion rate, control illumination of a headlight of the vehicle to project a generally level illumination pattern; and
when the motion data is not between the predefined minimum motion rate and the predefined maximum motion rate, calculate the vehicle bank angle value.

10. The apparatus of claim 9, wherein the processor is further programmed to soft average a bank angle value toward zero when the motion data is between the predefined minimum motion value and the predefined maximum motion value.

11. The apparatus of claim 9, wherein the processor is further programmed to indicate the vehicle as not banking when the motion data is between the predefined minimum motion rate and the predefined maximum motion rate.

12. The apparatus of claim 9, wherein the motion data includes yaw rate data.

13. A control system for a headlight for a vehicle comprising:
a vehicle headlight including a plurality of illumination elements, the vehicle headlight being configured to control an illumination pattern generated by one or more of the plurality of illumination elements in response to a bank angle value; and
a processor configured to calculate the bank angle value based on a bank angle calculation, the processor being adapted to:
receive motion data from a motion sensor;
compare the motion data to a predefined minimum motion value and a predefined maximum motion value;
when the motion data is between the predefined minimum motion value and the predefined maximum motion value, reduce illumination of at least one or more of the plurality of illumination elements; and
when the motion data is not between the predefined minimum motion value and the predefined maximum motion value, calculate the bank angle value.

14. The control system of claim 13, wherein the processor is further adapted to soft average a bank angle value toward zero when the motion data is between the predefined minimum motion value and the predefined maximum motion value.

15. The control system of claim 13, wherein when the motion data is not between the predefined minimum motion value and the predefined maximum motion value, an intensity of the illumination elements is modulated based on the calculated bank angle value.

16. The control system of claim 13, wherein when the motion data is not between the predefined minimum motion value and the predefined maximum motion value, the processor is further adapted to control the vehicle headlight to generate an illumination pattern associated with the calculated bank angle of the vehicle.

17. The control system of claim 13, wherein the processor is further adapted to:
receive roll rate data from the motion sensor;
compare a roll rate sum value to a predefined minimum drift and a predefined maximum drift, and when the roll rate sum value is between the predefined minimum drift and the predefined maximum drift, determine a current roll rate sum value by adding the received roll rate data to a previous roll rate sum value, and then increment a counter value; and
when the roll rate sum value is not between the predefined minimum drift and the predefined maximum drift, divide the current roll rate sum value by the counter value to produce a new roll rate average, and divide the sum of the new roll rate average and a predetermined value for an offset by two to calculate a motion sensor offset.

18. The control system of claim 13, wherein the motion data includes yaw axis data, the yaw axis data including yaw rate data.

19. The control system of claim 18, wherein when the yaw rate data is not between the predefined minimum yaw rate and the predefined maximum yaw rate, the processor is further adapted to determine a roll data sum, the roll data sum equal to a roll rate data value minus the motion sensor offset value.

20. The control system of claim 13, wherein the bank angle value is calculated using the equation:

$$\text{bank angle}_{new} = \text{bank angle}_{old} + \text{roll rate data value} * K,$$

where K is a scale factor based on a sample rate t, a bank angle calculation period, and a resolution of the motion sensor.

\* \* \* \* \*